(12) United States Patent
Heiferling et al.

(10) Patent No.: US 7,957,355 B1
(45) Date of Patent: Jun. 7, 2011

(54) SWARM AUTONOMOUS ROUTING ALGORITHM FOR MOBILE AD HOC NETWORK COMMUNICATIONS

(76) Inventors: Mark J. Heiferling, Burton, OH (US); Jonathon C. Kelm, Shaker Heights, OH (US)

( * ) Notice: Subject to any disclaimer, the term of this patent is extended or adjusted under 35 U.S.C. 154(b) by 1077 days.

(21) Appl. No.: 11/421,067

(22) Filed: May 30, 2006

Related U.S. Application Data

(60) Provisional application No. 60/685,504, filed on May 27, 2005.

(51) Int. Cl.
*H04W 4/00* (2009.01)
(52) U.S. Cl. .... 370/338; 370/351; 370/392; 370/395.31
(58) Field of Classification Search .................. 370/338, 370/328, 351, 392, 395.31
See application file for complete search history.

(56) References Cited

U.S. PATENT DOCUMENTS

| | | | | |
|---|---|---|---|---|
| 7,522,547 | B2 * | 4/2009 | Lee et al. | 370/312 |
| 7,590,589 | B2 * | 9/2009 | Hoffberg | 705/37 |
| 7,698,463 | B2 * | 4/2010 | Ogier et al. | 709/242 |
| 2004/0082343 | A1 * | 4/2004 | Kim et al. | 455/456.1 |
| 2005/0152318 | A1 * | 7/2005 | Elbatt et al. | 370/338 |
| 2006/0092913 | A1 * | 5/2006 | Joseph et al. | 370/351 |
| 2006/0120371 | A1 * | 6/2006 | Huang et al. | 370/392 |
| 2006/0235997 | A1 * | 10/2006 | Munirajan et al. | 709/245 |

OTHER PUBLICATIONS

Pheromone-Aided Robust Multipath.pdf.*
Routing for Mobile Ad-Hoc Networks.pdf.*

* cited by examiner

*Primary Examiner* — Wayne Cai
(74) *Attorney, Agent, or Firm* — D.A. Stauffer Patent Services, LLC

(57) ABSTRACT

A Swarm Autonomous Routing Algorithm (SARA) is performed by simple communication node devices for node to node communications in a network, especially a Mobile Ad hoc NETwork (MANET). Each node maintains a table of pheromone values for known neighbor nodes. Pheromone values are dynamic for adapting to a dynamic arrangement of nodes, and are updated either passively or actively. Routing tables are not used. When a node receives a packet, it uses the pheromone table to simply determine whether or not to forward (rebroadcast) the packet to a neighbor node, and if possible, determines and indicates the best neighbor node for next forwarding the packet. Destination Zone Routing (DZR) and Swarm Location Service (SLS) are alternative enhancements of SARA that can be used for more efficient routing when nodes are location aware/knowledgeable. SLS may also be used to improve routing algorithms other than SARA.

15 Claims, 24 Drawing Sheets

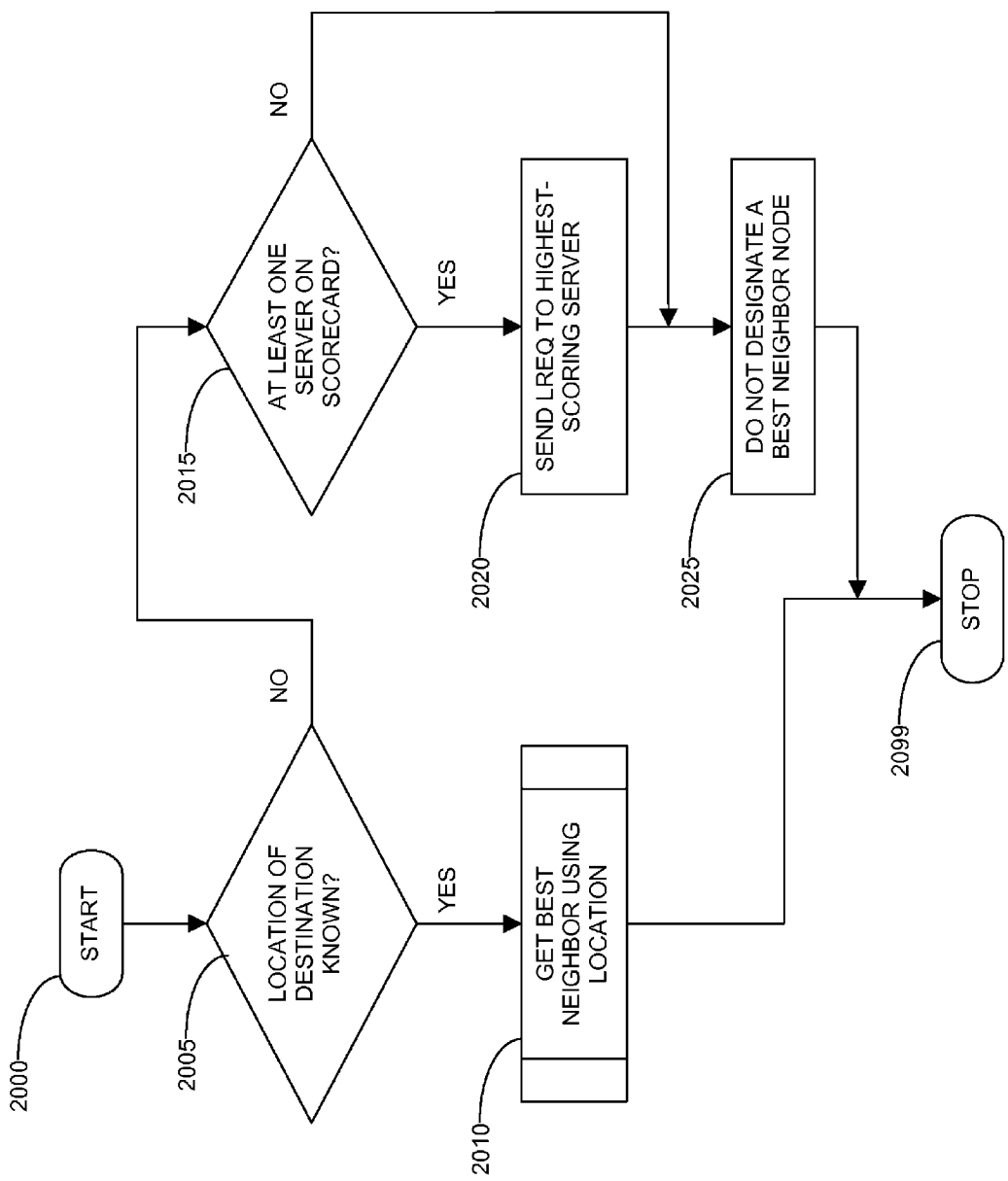

SWARM AUTONOMOUS ROUTING ALGORITHM FOR MOBILE AD HOC NETWORK COMMUNICATIONS

CROSS-REFERENCE TO RELATED APPLICATIONS

This application claims the benefit of U.S. Provisional Patent Application No. 60/685,504, filed May 27, 2005 by Mark J. Heiferling, and incorporated by reference in its entirety herein.

STATEMENT REGARDING FEDERALLY SPONSORED RESEARCH OR DEVELOPMENT

Portions of this invention were made with US Government support under DARPA Contract Number DAAH0103CR163. The US Government has certain rights in this invention.

TECHNICAL FIELD OF THE INVENTION

The present invention relates to wireless communication networks and, more particularly, to ad hoc wireless communication networks among freely mobile network nodes.

BACKGROUND OF THE INVENTION

Mobile Ad Hoc Networks

Reliable communication is critical to every mission carried out by the modern military, and advancements in wireless standards and protocols promise to bring about a new generation of the "digital battlefield." It is generally assumed that in the near future, wired networks will provide a backbone for the Global Connectivity Grid, while wireless systems will provide the "last mile" connections for communications devices, sensor networks, and other field equipment. The need for communication between an abundance of different devices, and an inability to rely on a fixed infrastructure, suggests that a MANET (Mobile Ad hoc NETwork) architecture be used for this last mile connection. A MANET is an arbitrary network of freely-mobile communication devices that communicate wirelessly with one another (e.g., by radio, i.e., RF communication), inspired by DARPA's work with packet radio networks in the early 1970s. Each communication device in a network of devices is referred to as a "node" in the network.

FIG. 1A illustrates an example of a MANET in a military situation, including nodes such as a rearward command center 100, mobile communicators carried by individual soldiers 110, land vehicles 120, aircraft 115, and fixed devices 105, the last of which can include semi-permanent base or relay stations, randomly placed sensors with radio communication (e.g., motion detectors air dropped into forward areas), and scattered relay nodes. It can be seen that such a MANET presents significant challenges for communications routing because each node of the network has its own broadcast range which may be relatively short; there may be relatively few, if any, fixed relay nodes; there may be only a few nodes in a small area, or there can be hundreds if not thousands of nodes randomly and/or non-uniformly located over a very large and changing geographic area; and many nodes are changing location in unpredictable and possibly extremely rapid manner (e.g., aircraft).

Referring to FIG. 1B, given these network characteristics, MANET nodes generally must communicate by relaying a communications "packet" from a source node 130 to a destination node 145 by hopping through intermediate nodes 150 (collective reference for intermediate nodes 150a, 150b, 150c), since each broadcasting node 130, 150 has its own (maximum) broadcast range 140 as shown by dashed line circles. For example, source node 130 has a broadcast range 140a which does not reach the desired destination node 145, but other nodes 135a, 135b plus the other node which became the first intermediate node 150a are within the source node's broadcast range 140a. Likewise, second intermediate node 150b is within the first intermediate node's broadcast range 140b; third intermediate node 150c is within the second intermediate node's broadcast range 140c; and finally the destination node 145 is within the third intermediate node's broadcast range 140d. The best system for communicating a packet from the source node 130 to the destination node 145 through a MANET will be the system that incorporates routing software algorithms that can most quickly and reliably determine an efficient route for any MANET communication situation. In other words, each node in a hopping communication situation must be able to determine the best next intermediate node 150, just as the source node 130 selected intermediate node 150a rather than the other nodes 135 that were also within its broadcast range 140a. An "efficient" route gets the packet to the destination node 145 most quickly (and with the least number of errors that could corrupt the contents of the packet).

Unfortunately, existing technology does not exhibit the high scalability, reliability, and adaptability needed to successfully implement large mobile ad hoc networks. In fact, many existing MANET standards and protocols are ported directly from the wired world, and do not deal well with the difficulties presented by the lack of a fixed network structure. Among these difficulties are node mobility, network traffic, network size, and node faults. Although dozens of algorithms have been proposed to solve the MANET routing problem, none of them addresses all of these satisfactorily.

Communication Nodes

Communication devices suitable as nodes in a MANET can be assumed to have at least the following minimum characteristics, as illustrated in FIG. 1C. Minimally the node device 160 must have a communications transmitter and receiver (TX/RX) and a microprocessor capable of controlling the functioning of the device 160, including basic operational control and also control of packet routing. The microprocessor will have some form(s) of memory associated with it, not only for storing its control and routing algorithms (as software or firmware) and operational parameters (e.g., a unique node identifier) but also for at least temporary storage of packets. Other stored information depends upon the operations required of the device 160 as will be detailed hereinbelow. A power source is also necessary for operation of the device, but can be anything from common battery cell(s), to solar cells, to power scavenging means (e.g., deriving power from ambient RF radiation, vibration, heat, stress/piezoelectric, etc). Unless the device 160 is used as a passive relay or server node, the device 160 will also include some type of user input and/or output (I/O), which can include, for example, a microphone or other type of sensor for input, and an earphone or speaker for output. Finally, but also optionally, the node device 160 may advantageously include some form of localization means (e.g., GPS) for determining its own geographic location.

Goals and Specifications

The military has determined from its experience that it needs a force that can be deployed rapidly to any conflict. The goal is a much lighter, more rapidly deployable and supportable force in targeted conflict areas. This vision will be a strategically responsive force that can deploy combat-capable forces anywhere in the world quickly and efficiently.

The operational concept of this vision includes smaller units with higher mobility and weapons of greater precision and lethality. Since forces will not be highly massed and vehicles will be smaller and have less physical protection, the key to providing survivability of the force is real-time information on the friendly forces and the enemy situations, available continuously so that decisions can be made and actions can be taken quickly.

These new forces must have a fully-mobile, fully-communicating, agile, and situation-aware force that exploits net-centric distributed platforms to enhance its survivability and lethality. These forces consist of a heterogeneous mixture of individual soldiers, manned and unmanned platforms, and sensors. All these components will operate in a wireless, mobile, highly dynamic or ad hoc networking environment.

The information infrastructure that supports these forces will need to be rapidly deployable, self-organizing, adaptive, self-contained, multi-layered, survivable, and interoperable with other military networks and with DOD's Internet-based Global Information Grid (GIG). Survivability must be maintained in spite of the inherent vulnerabilities of the commercial technologies and techniques that will be leveraged by the military.

Applications are almost unlimited and many programs throughout the military have inherent needs now and in the near future, such as Future Combat Systems (FCS), FORCEnet, Future Force Warrior in C4ISR, Sensors & Communications (C4ISR) and many others.

Based on the above, an example listing of desired specifications is as follows:

Scalability: 100,000 nodes or more.

Node Initialization time: Much less than 1 second.

Goodput: 10 times higher than is achievable with standard (prior art) communication/routing protocols.

Approximate node cost of materials: Less than $100 (excluding optional localization means).

These are networks of low-power, inexpensive, smart devices with multiple on-board sensors, connected through wireless links to form a collaborative network to perform high-level tasks. This opens up a new paradigm of ubiquitous computing and enables a range of applications that are previously unrealizable. Given the limitations of embedded hardware, one of the key areas toward achieving superior performance is through improvements in the software used to operate the smart device. Note: references herein to "software" are intended to generically refer to all embodiments of computer process algorithms, including, for example, programs stored in memory, and control sequences that are "hardwired" in a device.

Wireless sensor networks are designed to monitor and communicate conditions at different locations, such as velocity, temperature, sound level, etc. These networks have applications in many areas, including environmental monitoring, surveillance, asset tracking, and automation. In order to achieve maximum usability, nodes in a sensor network must be small, inexpensive, and adaptable to a dynamic environment.

Military Communications

Advances in military operations are stimulating DOD interest in untethered systems. U.S. military personnel now need to be prepared to move quickly throughout the world to respond to rapidly evolving regional conflicts and non-combat roles, such as peacekeeping and humanitarian response. Just as past equipment advances (e.g., aircraft carriers and long-range jet aircraft) shaped the military conflicts of yesteryear, information technology is shaping plans for the nation's future defense. Plans are being made for a digitized battlefield in which sensors are widely distributed and rapidly deployed, and multimedia wireless systems extend from front-line soldiers all the way back to the Pentagon. Advanced command, control, communications, computing, and intelligence (C4I) systems will make it possible to monitor an adversary on a computer screen, target specific threats, and neutralize them with the press of a button.

The DOD is taking a dual approach to meeting its future communications needs by funding selected R&D and demonstration projects, while also relying increasingly on commercial off-the-shelf (COTS) technical systems. The converse of this approach is that novel communications technologies developed for the military may very well have marketable applications in the commercial world.

The military has identified the development of secure, high-speed ad hoc wireless networks as a top priority, and several research institutions are presently in the process of developing the supporting technologies needed to realize this goal. Accomplishing the work proposed here would significantly advance the efficiency, robustness, and flexibility of ad hoc wireless communications for use in every branch of the military. Due to enhanced communication capabilities U.S. forces would possess an enormous tactical advantage over enemy forces in virtually every arena based upon self-healing, self-organizing ad hoc networks with the capacity to learn.

Standard (wired) network communications generally involve the use of routing tables that are determined and then stored at a node. Such a table has a size that grows with the number of destination nodes that a node must route to, and the table size in term determines the amount of memory that must be available at the node. Various techniques are employed to limit the size of a node's routing table, but these techniques generally rely on the relatively fixed and slowly changing nature of a predominantly wired network structure. Therefore routing table methods do not function very well in a MANET situation, particularly when the MANET includes a large number of nodes. Thus various researchers have worked with other models for routing in a MANET. One such model is analogous to the communication behavior of large groups of insects, each of which has extremely limited capability.

Swarm Intelligence

Millions of years of evolution have perfected the abilities of social insects such as ants, wasps, and termites to forage for food, find shelter, and defend their colonies. While the contribution of an individual member of a colony may be minimal, the combination of many members' efforts results in a pattern of "emergent behavior" with a powerful ability to solve problems in a dynamic environment. A classic example of emergent behavior is food foraging by ants. As ants travel to a food source, they lay down trails of odoriferous chemicals called "pheromones," which serve as an indication to other ants that food can be found by following the pheromone path. As more ants follow the path, more pheromones are laid and the scent becomes stronger. If ants stop following a path, the pheromone evaporates and the scent becomes weaker, a process called "pheromone decay." The term "stigmergy" refers to the process of modifying the environment to communicate between members of an emergent system.

An example of a prior art MANET communication routing method that incorporates "swarm intelligence" is disclosed by M. Roth and S. Wicker in their paper entitled "Termite: Emergent Ad—Hoc Networking," (presented at The Second Mediterranean Workshop on Ad-Hoc Networks, 2003). The Termite algorithm is described simply as follows. Each node in the network has a specific pheromone scent. As packets move through the network on links between nodes, they are biased to move in the direction of destination pheromone gradients. Packets follow this gradient while laying pheromone for their source on the links that they traverse. The amount of pheromone deposited by a packet on a link is equal to the utility of its traversed path. Using this method of pheromone updating, consistent pheromone trails are built through the network. Changes in the network environment, such as topological or path quality changes, are accounted for by allowing pheromone to decay over time. This requires paths to be continuously reinforced by new traffic; new information about the network is added to links. Each node records the amount of pheromone that exists for each destination on each of its links. This creates a routing table similar to those found in traditional link-state routing algorithms. Termite has been shown to perform well, especially in regions of high node mobility. However, packets often take substantially longer than necessary paths. In part, this is required in order to maintain current pheromone through the network, but this behavior can also generate significant resource inefficiencies.

Thus it is an object of the present invention to overcome the defects of the prior art by substantially avoiding or significantly minimizing the use of routing tables, as well as by improving the use of swarm intelligence to enhance MANET resource efficiencies.

It is an object to harness the power of swarm intelligence using a series of biologically-inspired algorithms that are simple, elegant, and highly effective.

It is a further object to provide algorithms that may be ported from one application to another, creating leverage for new, related developments, both in military and civilian commercial applications. Currently envisioned applications include, but are not limited to, very low-power, connectionless mobile ad hoc capability for sensor networks and other military needs. While the present development leverages COTS-based radios for IEEE 802.15.4 design and development, future development will include IEEE 802.11 and IEEE 802.16 for other applications. Non-military commercial applications include industrial sensor networks, cellular network extensions, active RFID, tracking devices, medical devices, emergency back-up communications, M2M communications, and many others.

BRIEF SUMMARY OF THE INVENTION

The basic Swarm Autonomous Routing Algorithm (SARA) is performed by individual nodes in a network. Each node maintains and uses a table of score values (pheromones) concerning all neighboring nodes that it knows of Pheromone values are dynamic, adapting to a dynamic arrangement of nodes in an ad hoc network. Unlike prior art MANET routing algorithms, routing tables are not used. When a node receives a communications packet, it uses the pheromone table to simply determine whether or not to forward the packet to a neighbor.

Swarm Location Service (SLS) is an enhancement of SARA that can be used for more efficient routing when nodes are location aware/knowledgeable. Since SLS is an improvement on prior art location service algorithms (e.g., GLS, HLS) it can be used in other systems, rather than only in a SARA network.

Destination Zone Routing (DZR) is an enhancement of SARA that can be used for more efficient routing when nodes are location aware/knowledgeable. It can be used in place of SLS, but unlike SLS, DZR requires the characteristics of SARA in order to be useful.

An analogy between food foraging behavior in ants and routing data packets in a MANET can be drawn by considering the set of nodes in the network as the "environment" and the data packets as "ants" in search of food. According to the invention, a Swarm Autonomous Routing Algorithm (SARA) is provided wherein a communication node (device) maintains tables of artificial pheromones, the strengths of which are influenced by the packets that are sent and received by the node. Routing decisions are made by comparing the pheromone values. Using the swarm intelligence model as a basis for a routing solution, networks can exhibit many of the same qualities as social insect colonies, including individual node simplicity, network robustness, and self-organization.

The method in which SARA works is simple and elegant. Nodes make routing decisions by determining a designated rebroadcasting node for a packet that is received. This node is chosen from among the neighbor nodes by comparing the pheromones associated with each neighbor. While any criteria may be used to influence this decision, some of the more useful parameters are link quality and geographical location. Upon receiving a packet, a node checks to see if it is the designated rebroadcasting node. If it is, it determines the next designated rebroadcaster and sends the packet on its way. If it is not the designated rebroadcaster, it may still rebroadcast the packet with some probability, referred to as the rebroadcast probability. Nodes "learn" by modifying the pheromone values associated with neighbor nodes when a packet is received. In other words, nodes passively listen to packets being sent on the network and gather information based on this. Since a node's transmission will be heard by every node within its broadcasting range, explicit acknowledgements are unnecessary. Instead, a node listens for the designated rebroadcasting neighbor to rebroadcast a packet and considers that its acknowledgement that the packet was received. An explicit acknowledgement packet is only sent by the ultimate destination, in order to inform the last node in the path that the packet was successfully received. The algorithm can operate in either a passive mode, using only data packets to influence pheromone values, or an active mode, in which a HELLO (ping) protocol packet is periodically sent throughout the network to facilitate learning. If a node is able to clearly receive its neighbors' broadcasts, the transmit pheromone between the node and that neighbor will be strong. If the neighbor is able to receive the node's broadcasts, the receive pheromone between the node and that neighbor will be strong. If both transmit and receive pheromones exist for a neighbor, a bidirectional link can be said to exist between the nodes. Nodes that lie on bidirectional links are the best candidates for designated rebroadcasting nodes.

The fact that SARA makes routing decisions "on the fly" by deciding whether to rebroadcast a packet is important, because it makes the algorithm very adaptable and expandable. Any kind of information can be used to influence routing decisions, such as link quality, geographical location, statistics gathered from past performance, energy consumption, etc.

According to the invention a mobile ad hoc network (MANET) algorithm for routing communications among a plurality of communication nodes, is provided wherein each node is a device that has computing and communication broadcasting capabilities plus a broadcastable identifier, the algorithm being a method implemented in each node, each node being a current node in the context of the algorithm steps it carries out; and the method in the current node comprising the steps of: establishing a transmission (TX) pheromone for each other node from which the current node receives a broadcast packet, and associating the other node's identifier with its respective TX pheromone; establishing a (TX) receiving (RX) pheromone for each neighbor node, wherein a neighbor node has a bidirectional link with the current node as evidenced by the current node receiving a packet from an other node that is a node having a non-zero valued TX pheromone, and associating the identifier of each neighbor node with its respective RX pheromone; for each other node, increasing the value of the other node's TX pheromone whenever a packet is received from the respective other node; decreasing the value of each non-zero valued TX pheromone whenever a predetermined amount of time elapses from the most recent value modification of the subject TX pheromone; for each neighbor node, increasing the value of the respective RX pheromone whenever a packet is received from the respective neighbor node and the received packet is a rebroadcast of a packet just previously broadcast by the current node; decreasing the value of each non-zero valued RX pheromone whenever a predetermined amount of time elapses from the most recent value modification of the subject RX pheromone; upon receiving a communication packet that is directed to a final destination node other than the current node, rebroadcasting the packet with an indicator identifying a preferred node to next rebroadcast the packet; and determining the preferred node by selecting a node from the set of neighbor nodes.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1A:
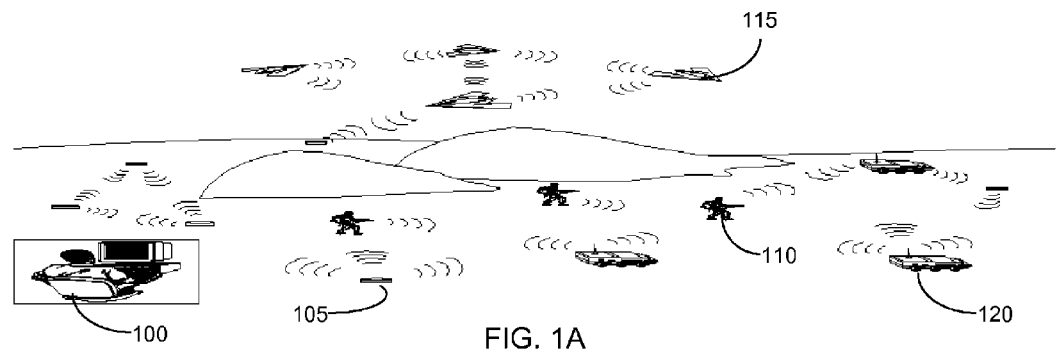
Figure 1B:
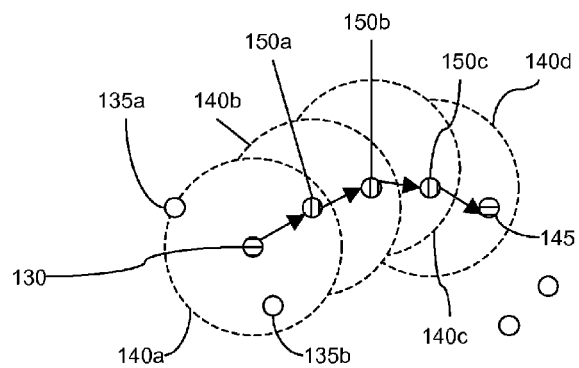
Figure 1C:
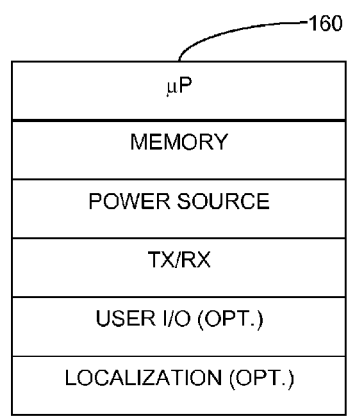
Figure 1D:
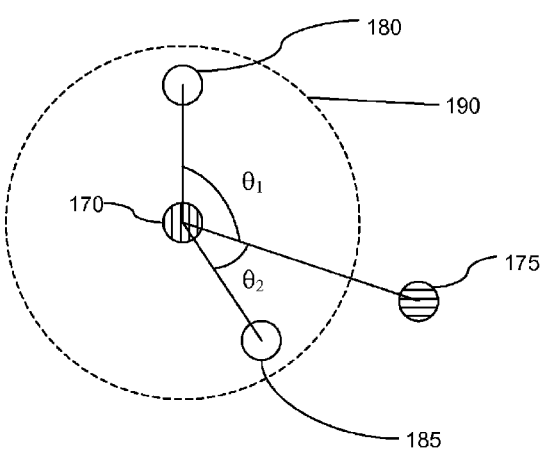
Figure 2:
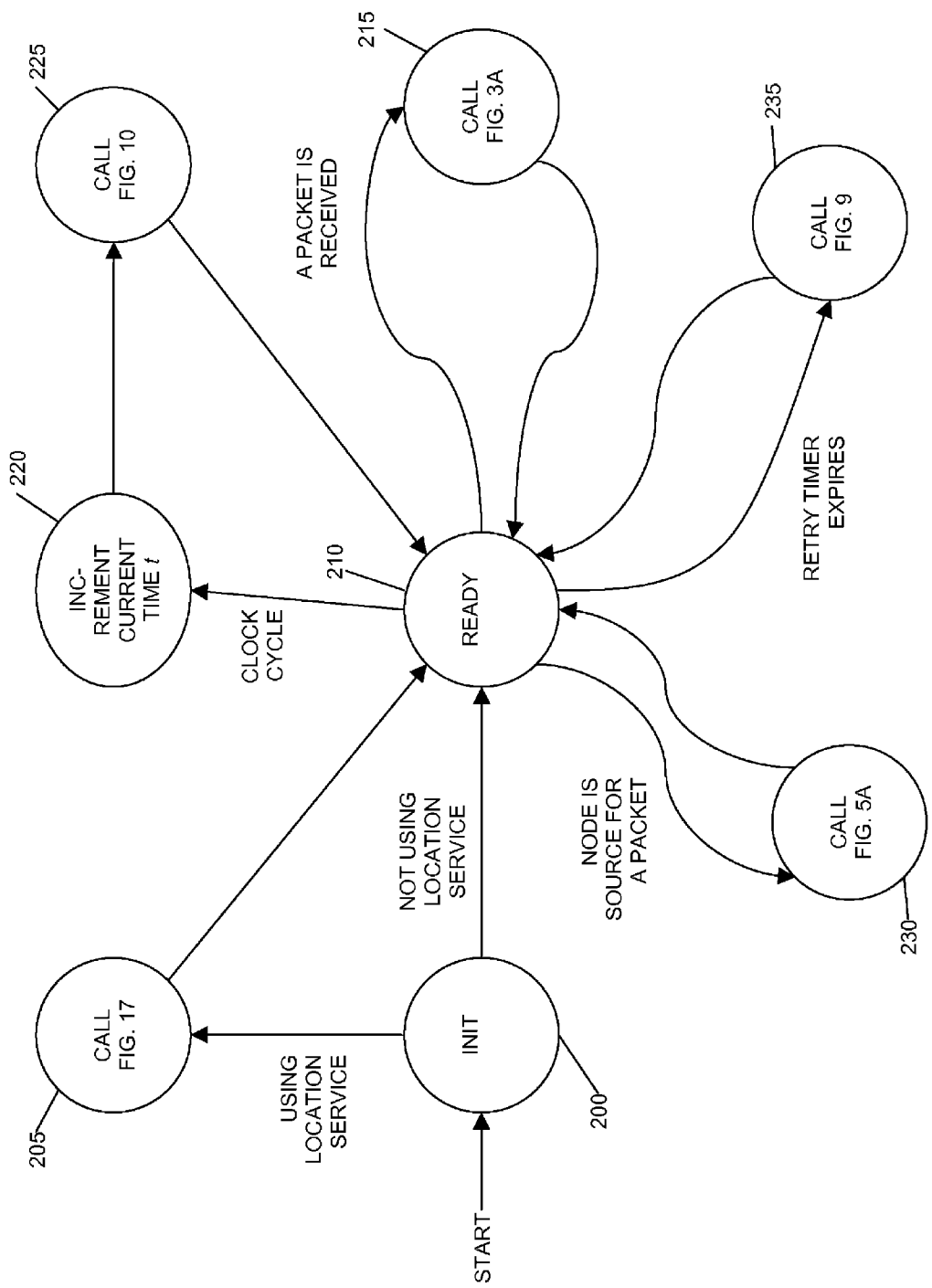
Figure 3A:
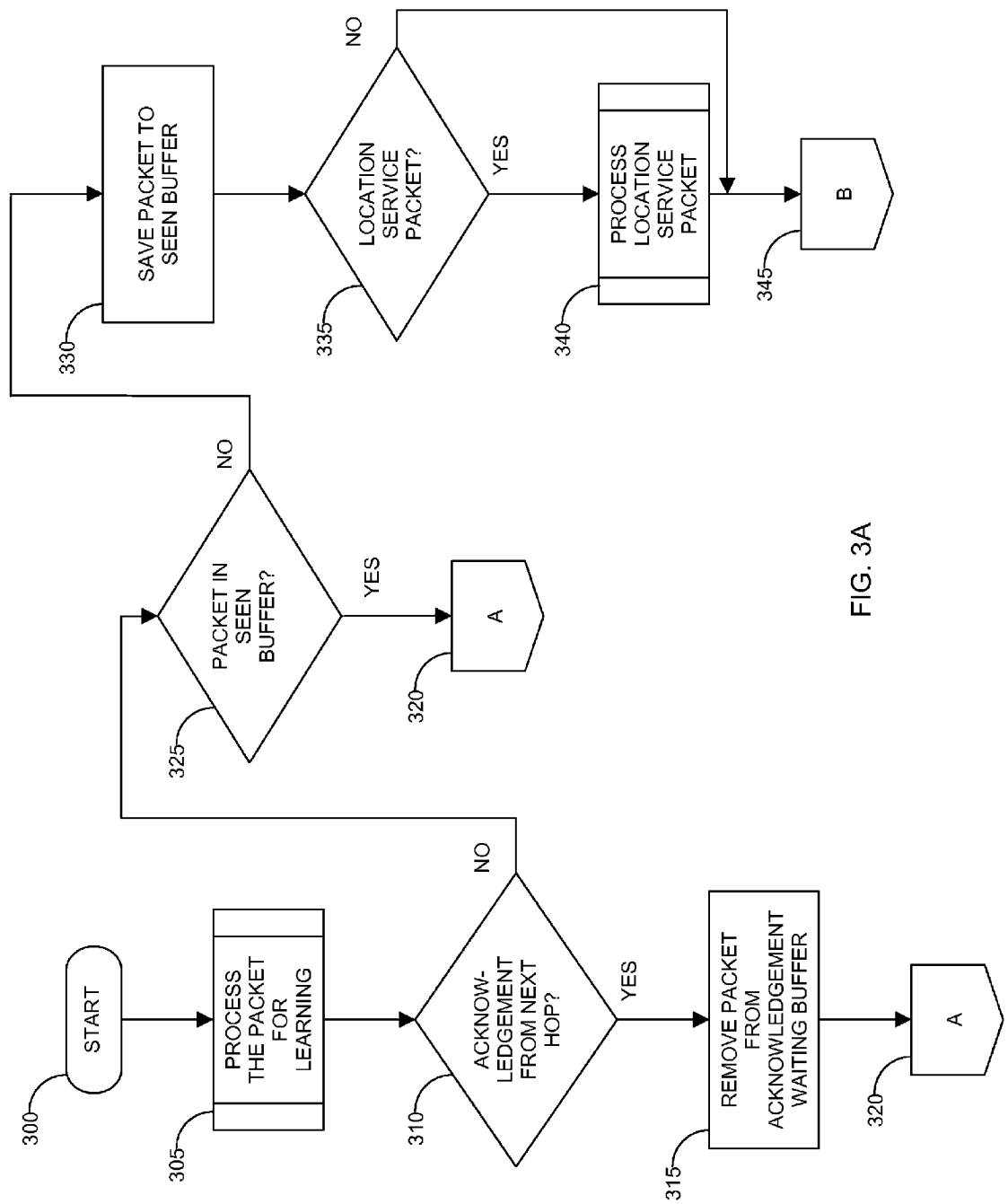
Figure 3B:
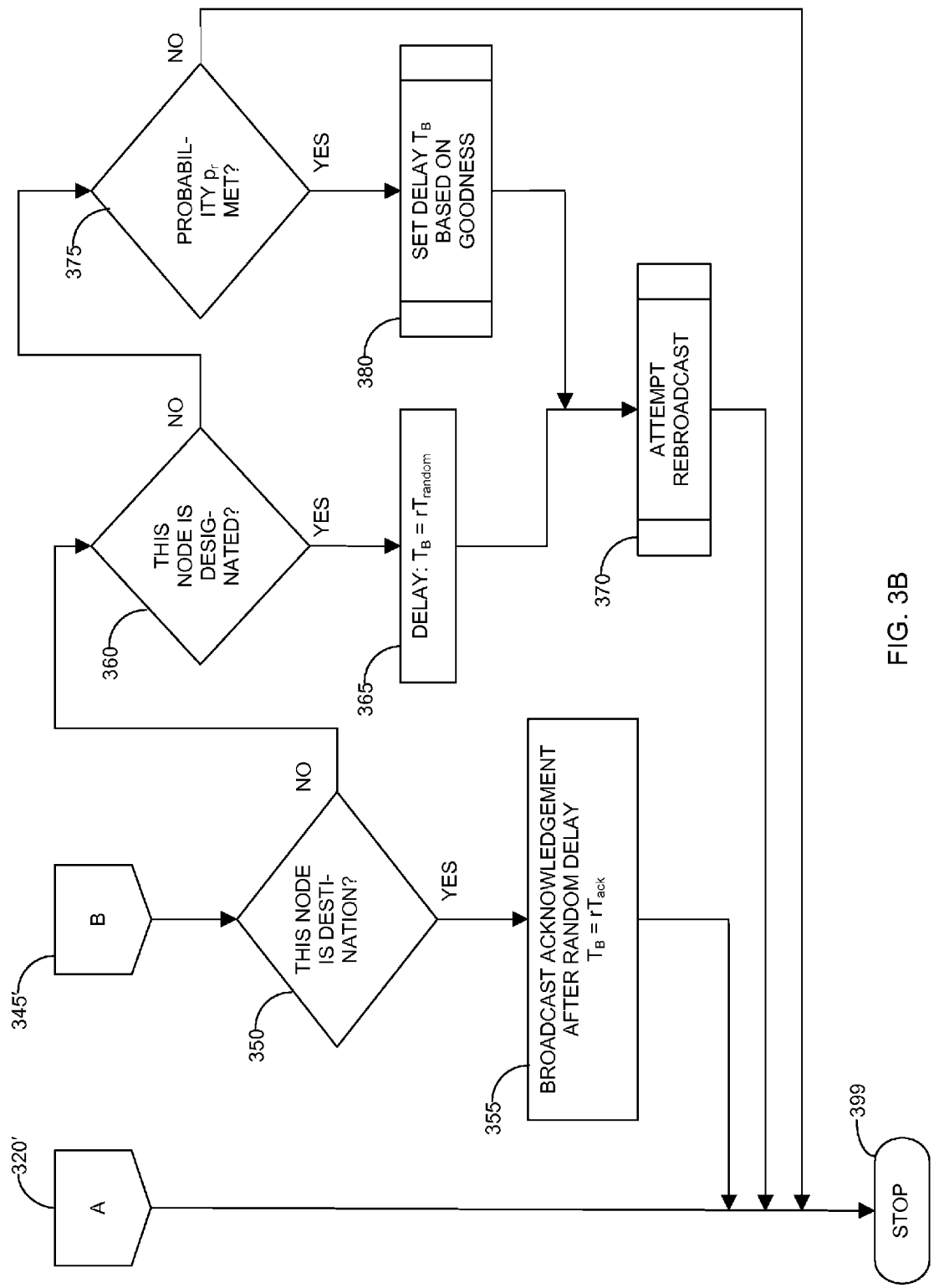
Figure 4:
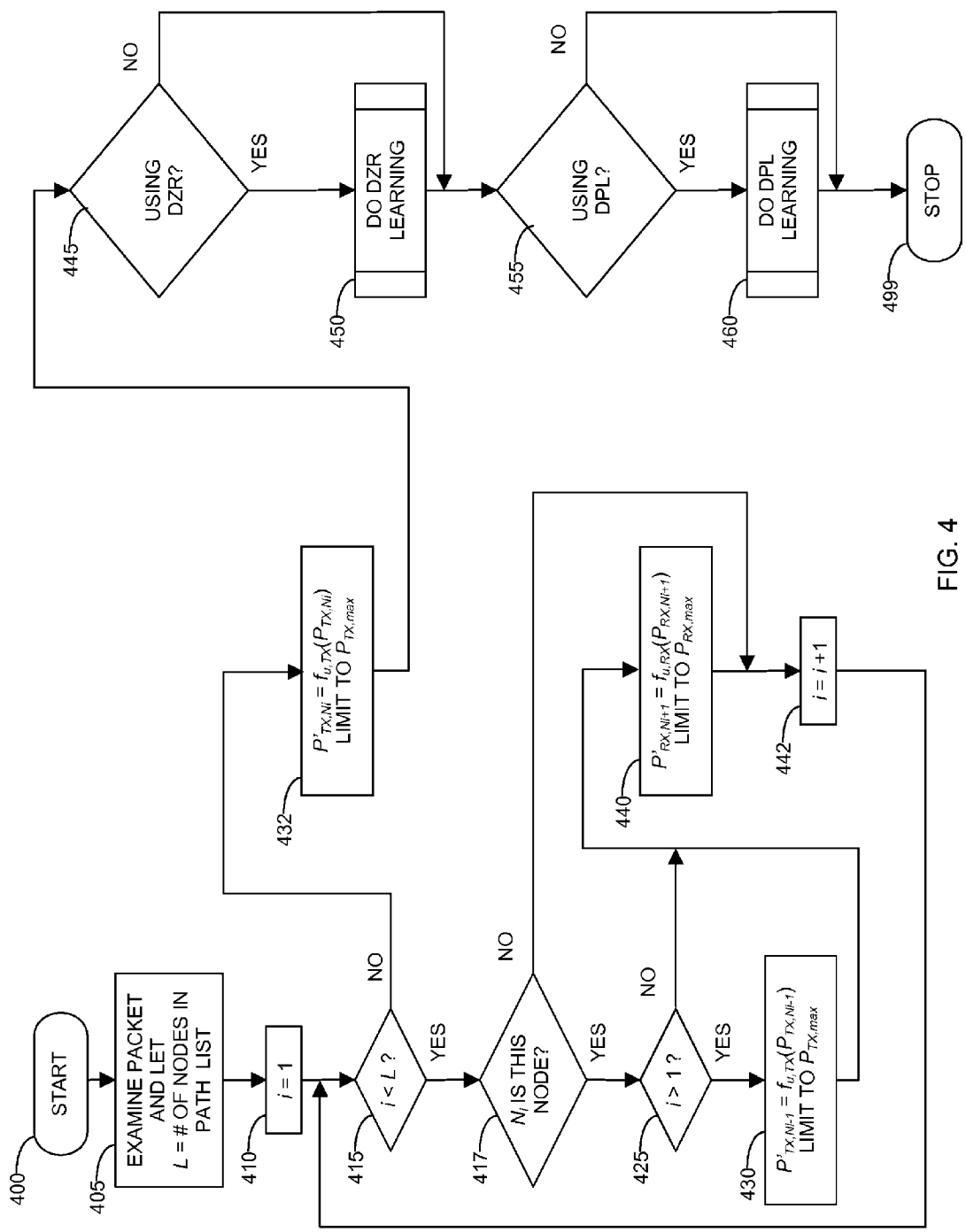
Figure 5A:
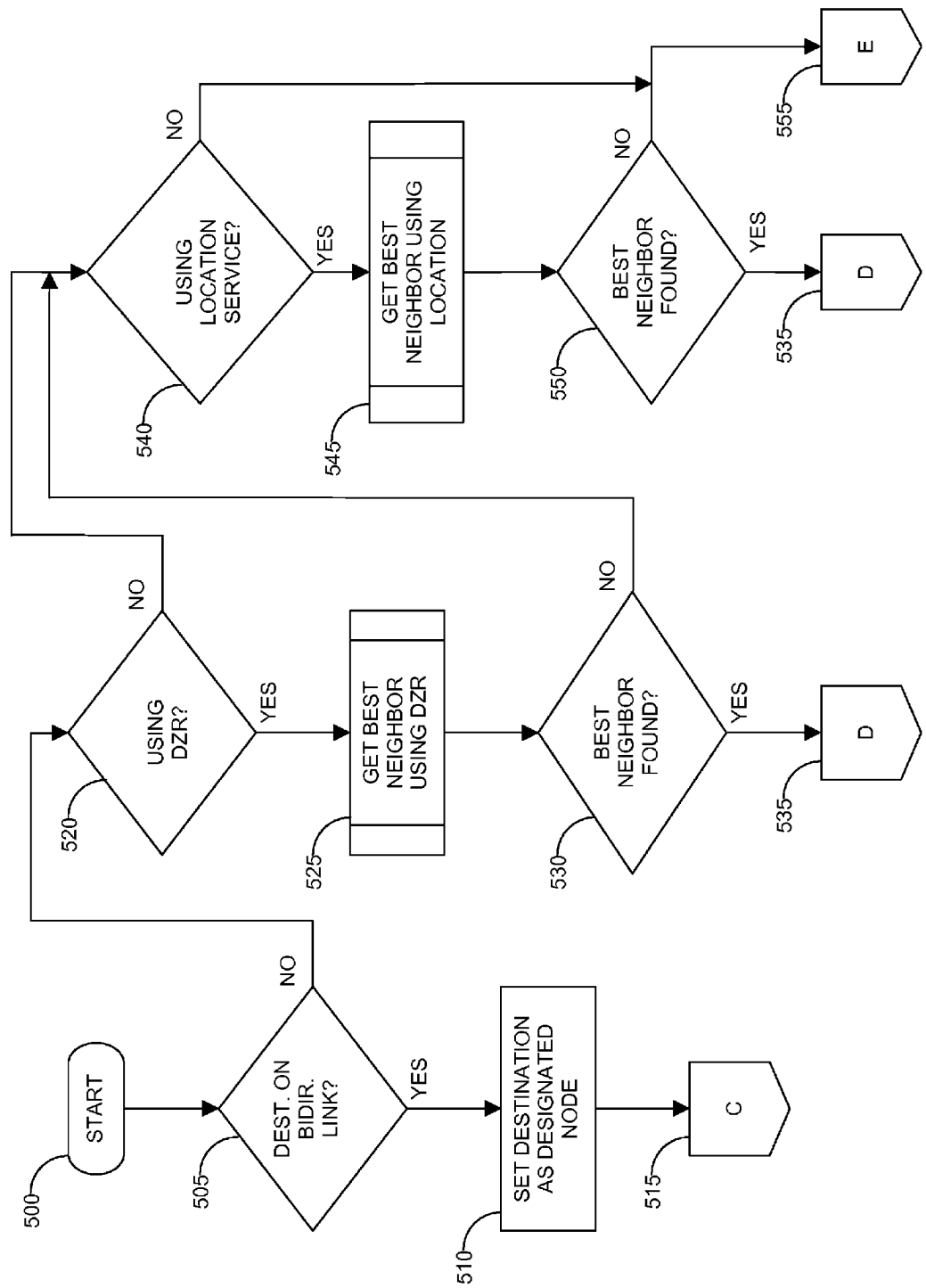
Figure 5B:
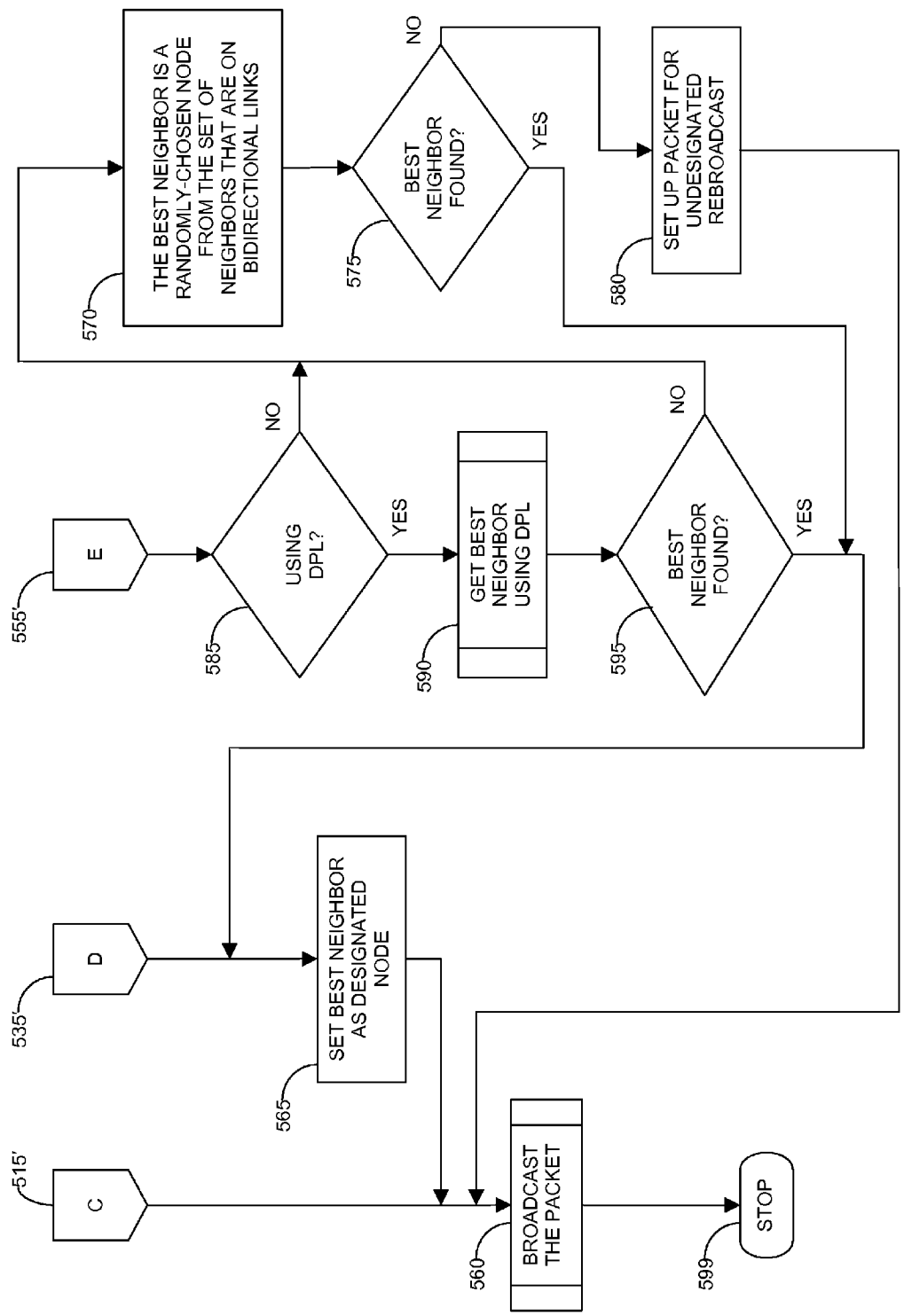
Figure 6:
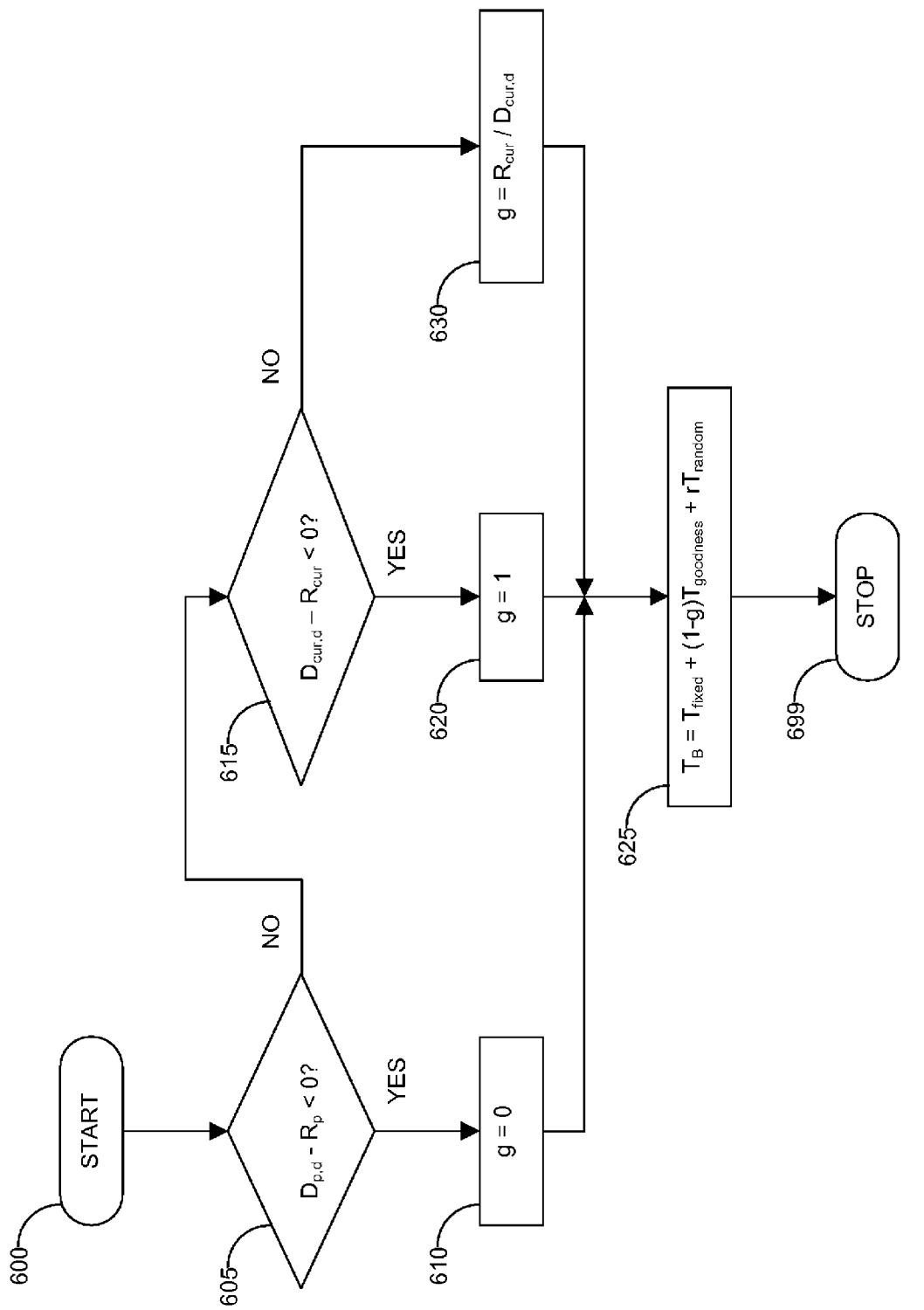
Figure 7:
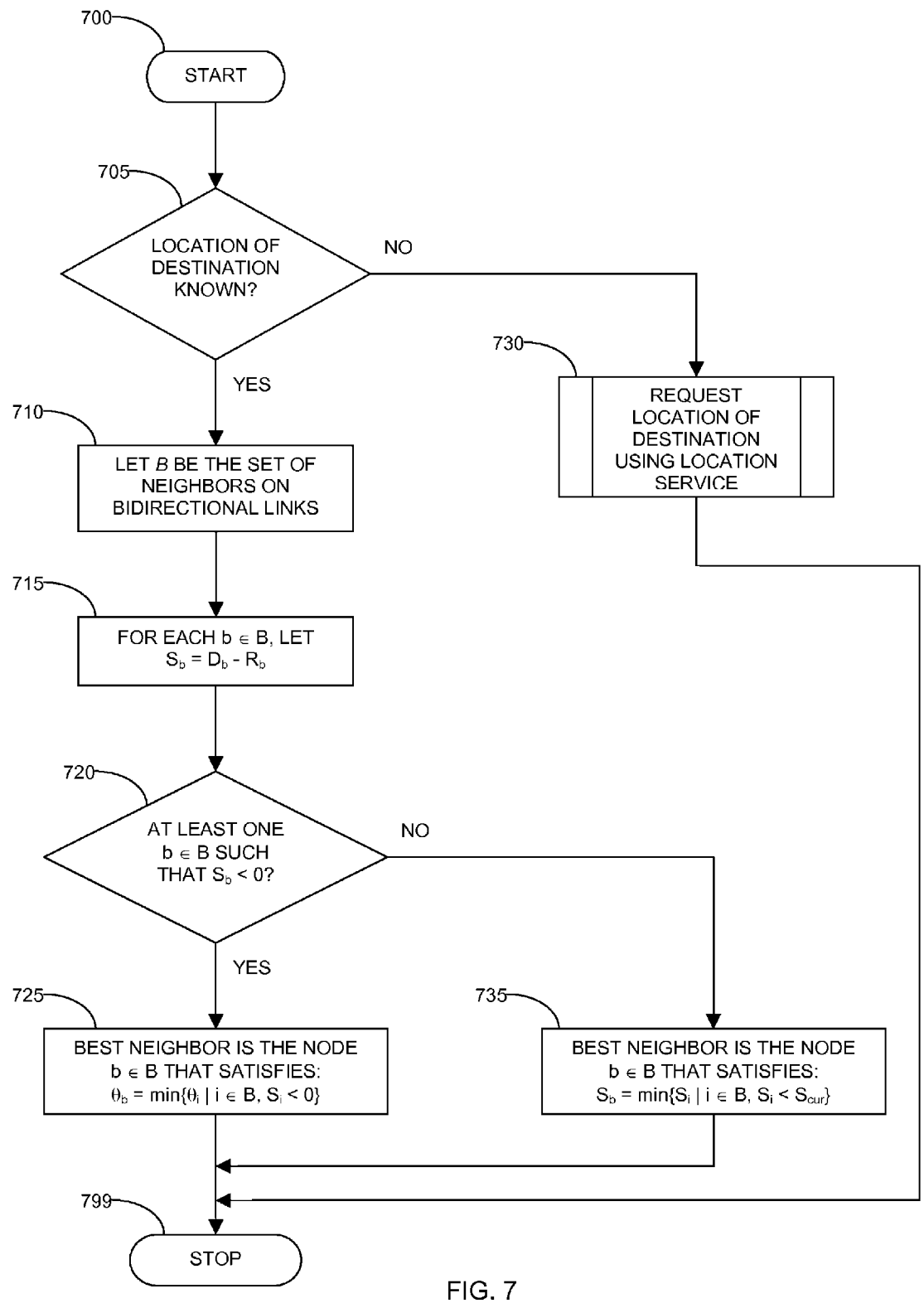
Figure 8:
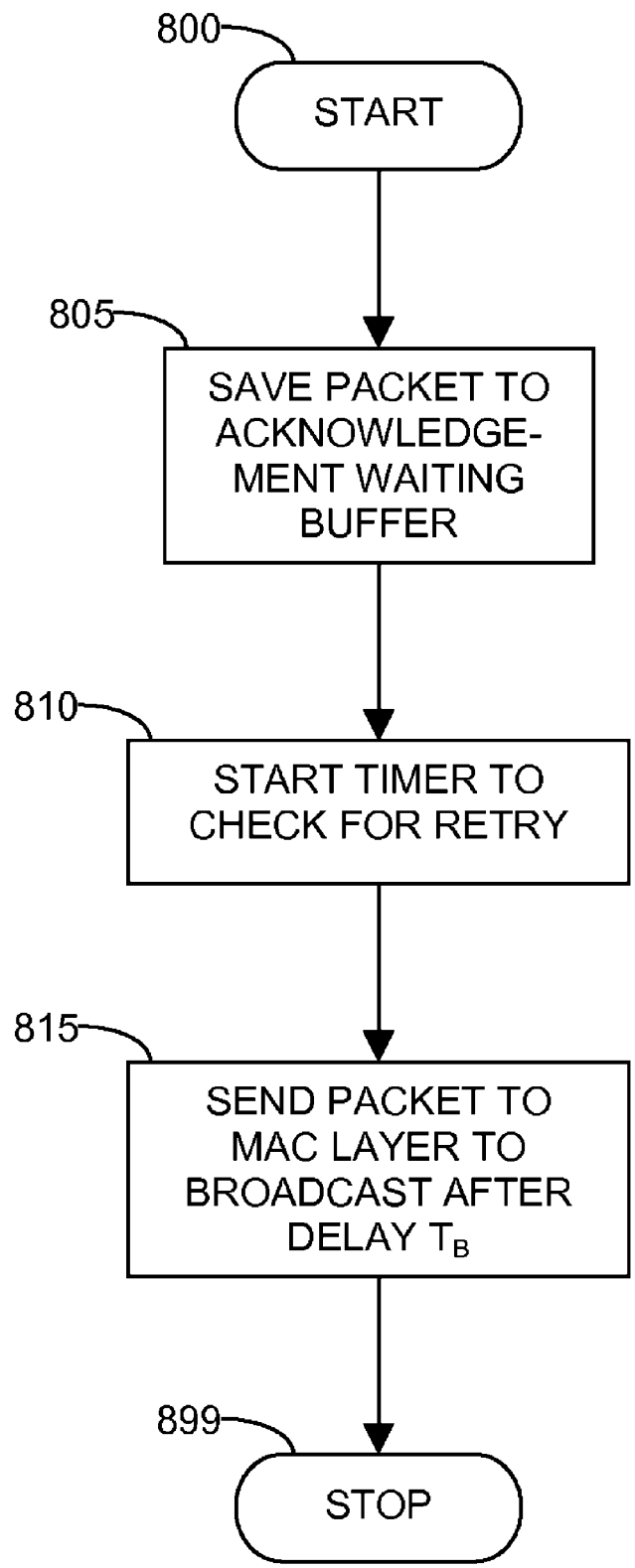
Figure 9:
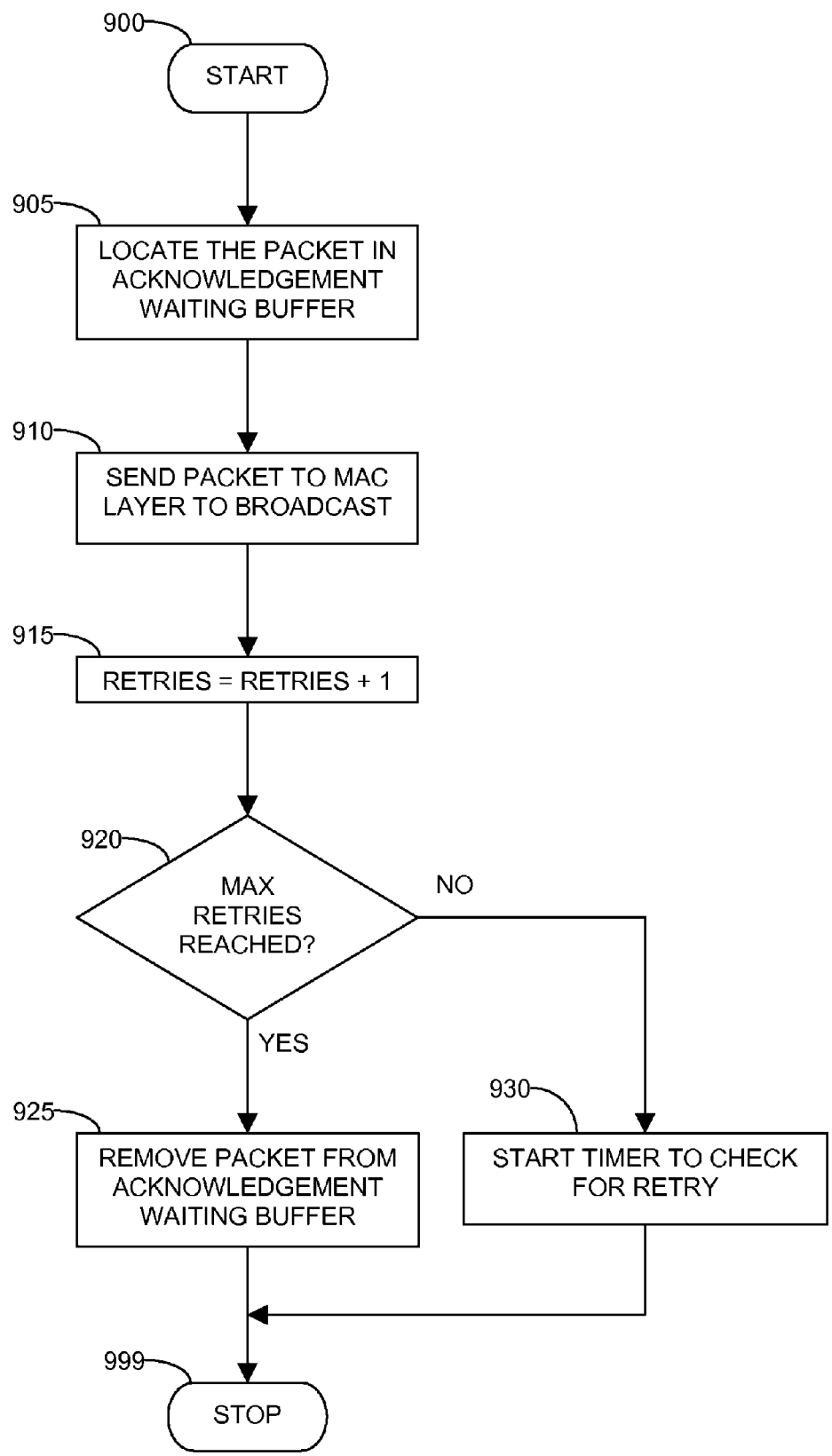
Figure 10:
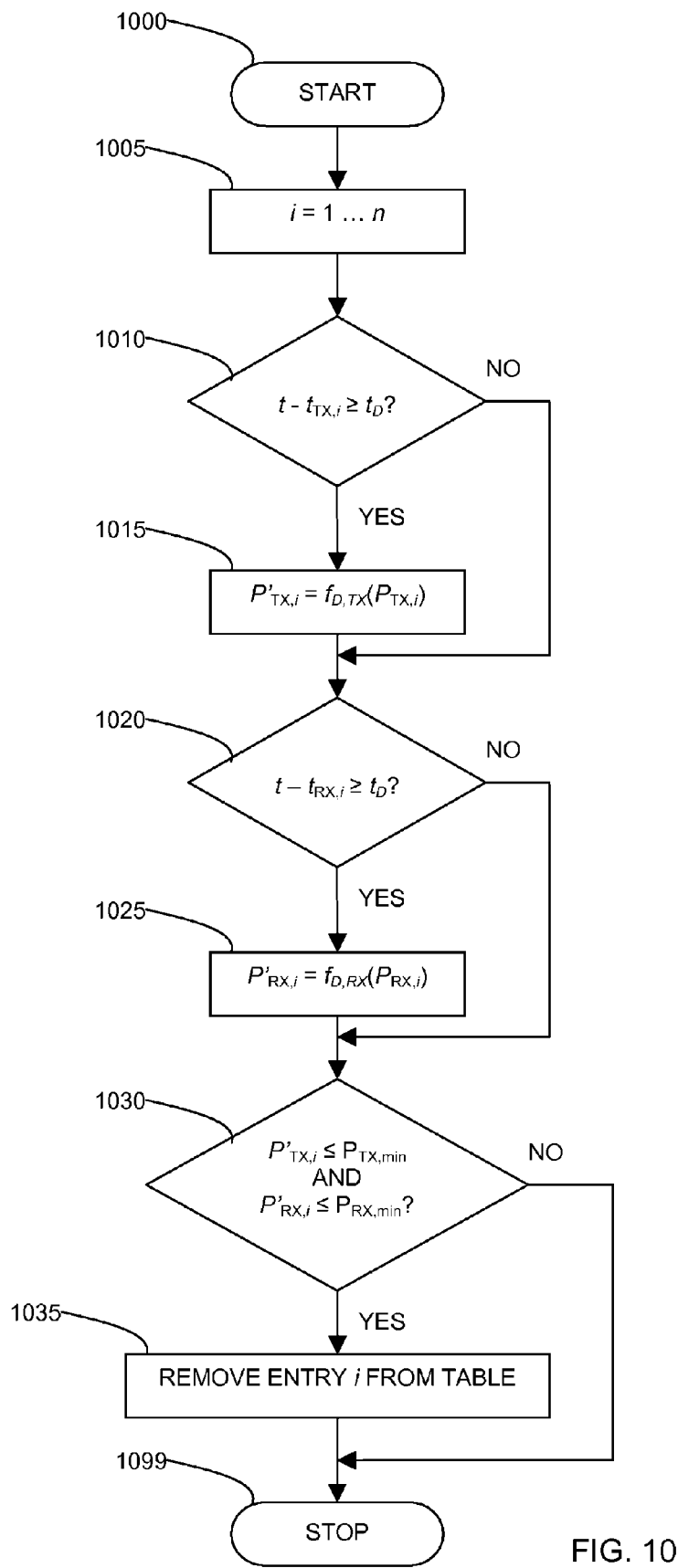
Figure 11:
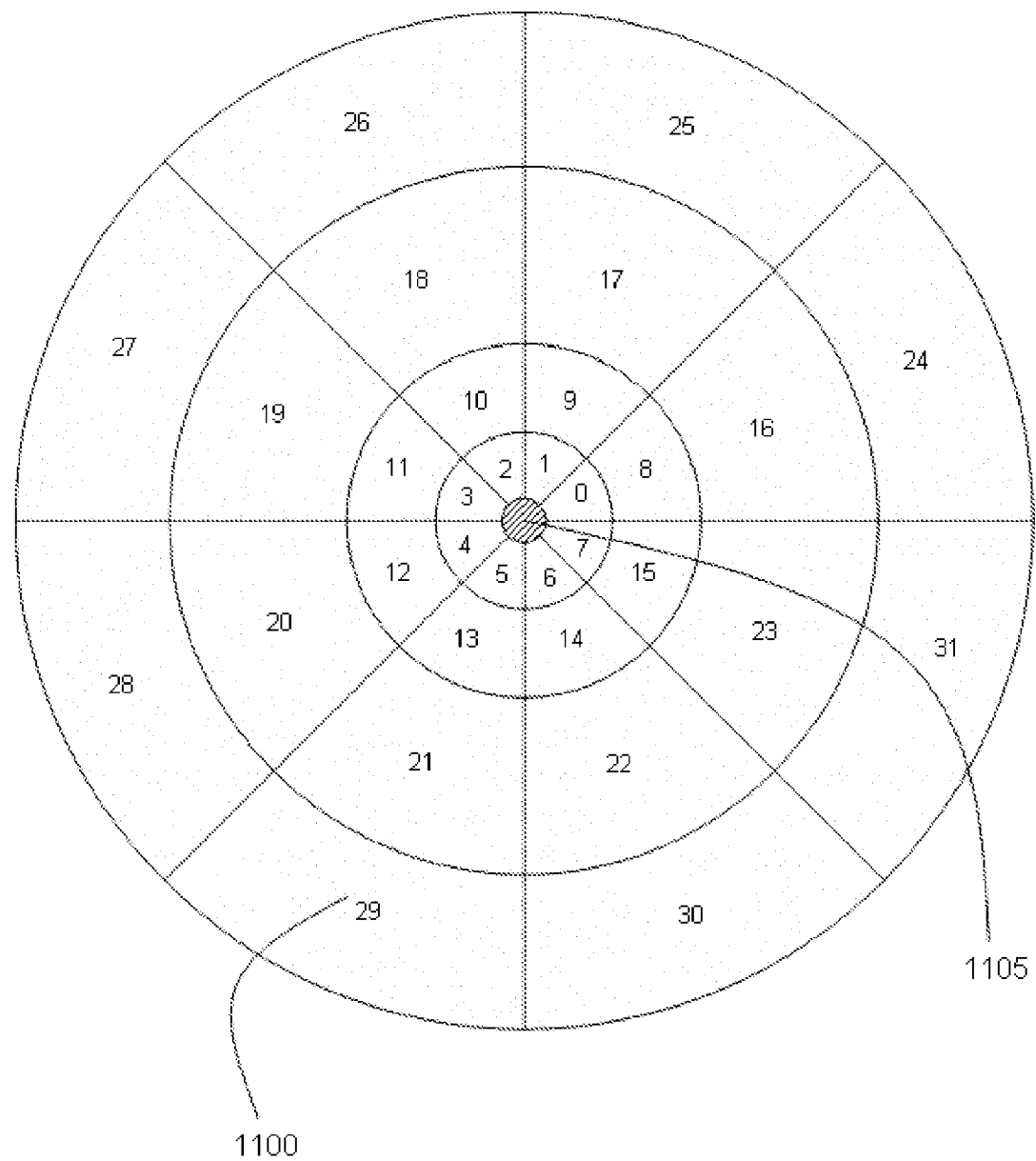
Figure 12:
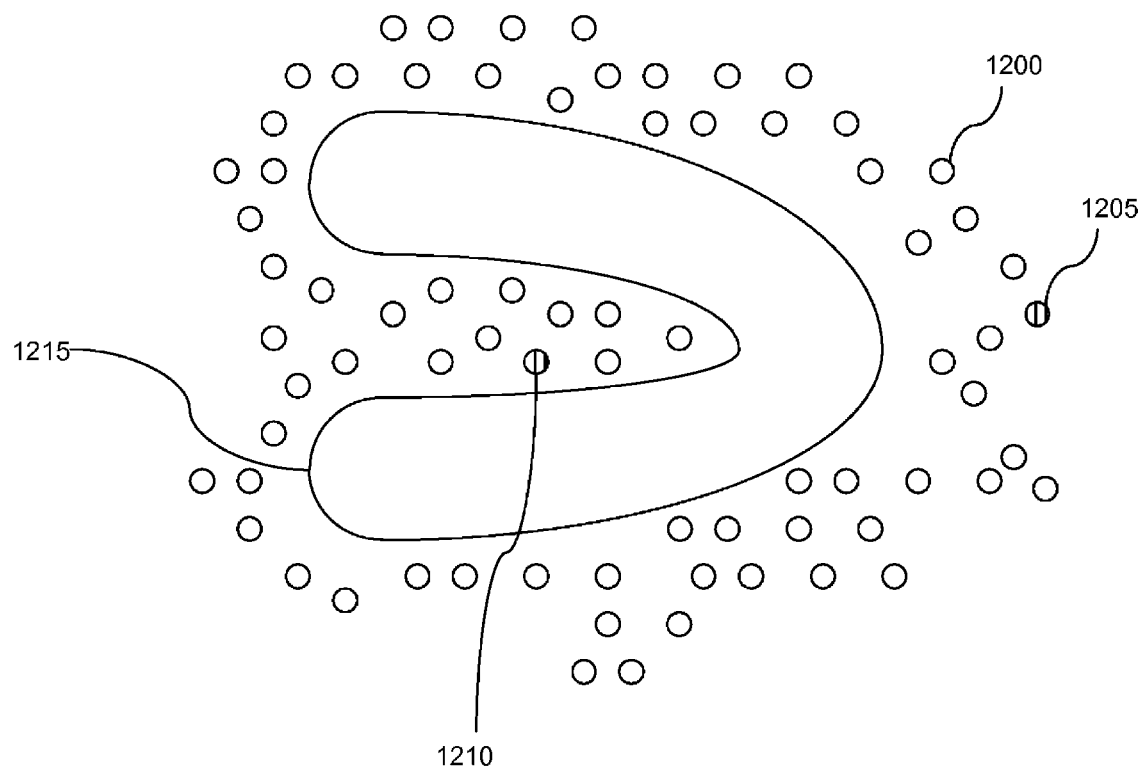
Figure 13:
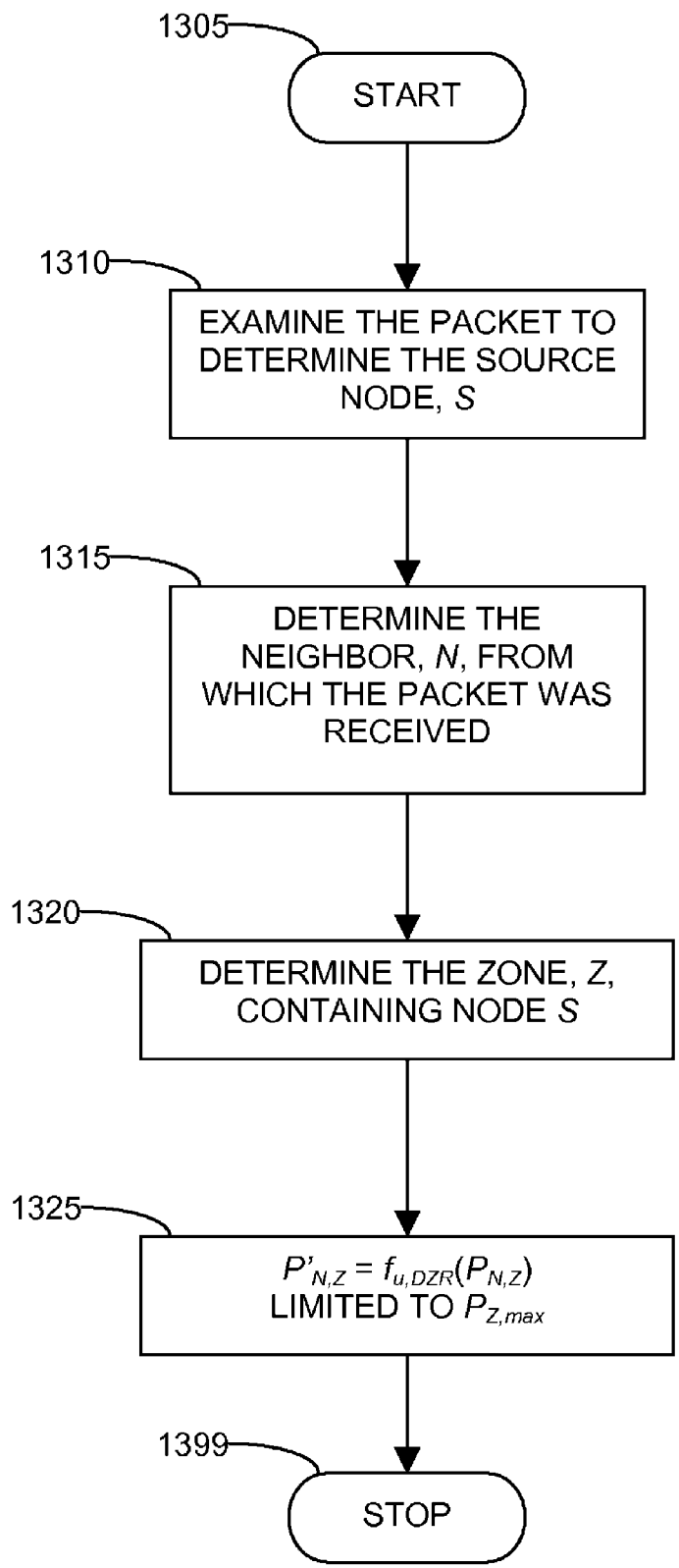
Figure 14:
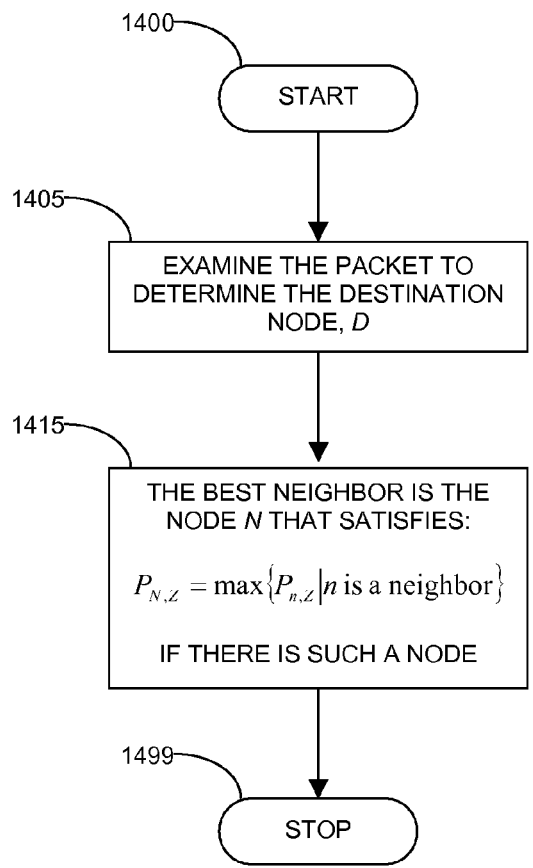
Figure 15:
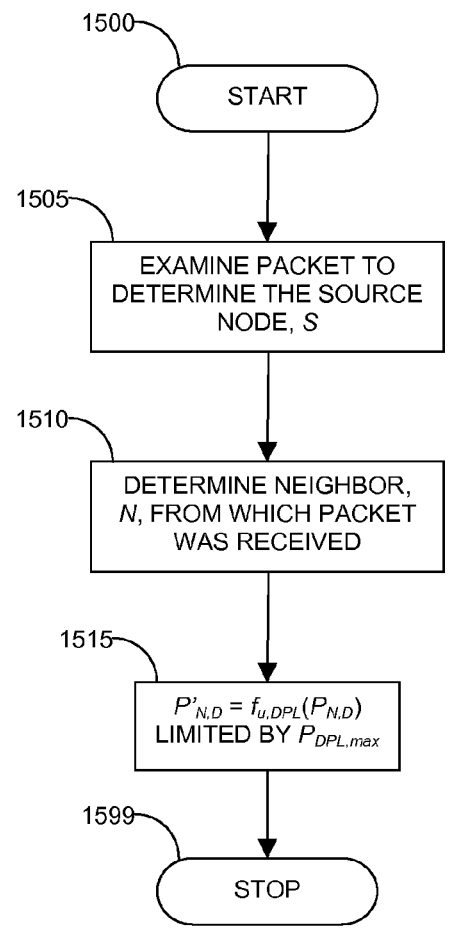
Figure 16:
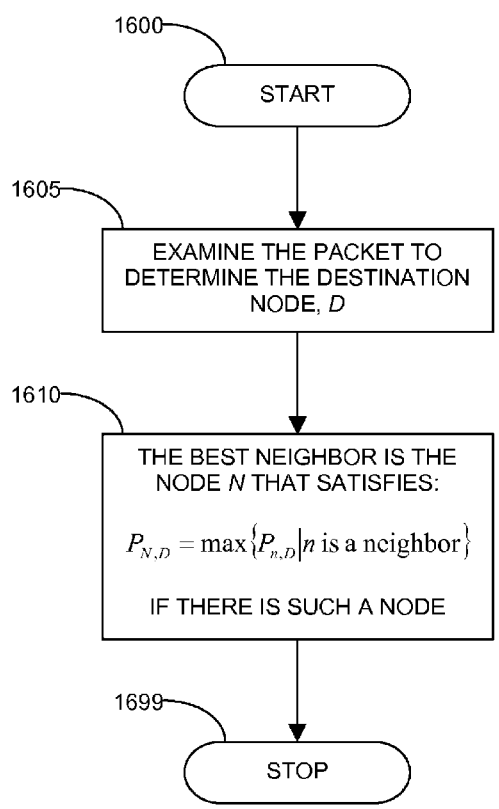
Figure 17:
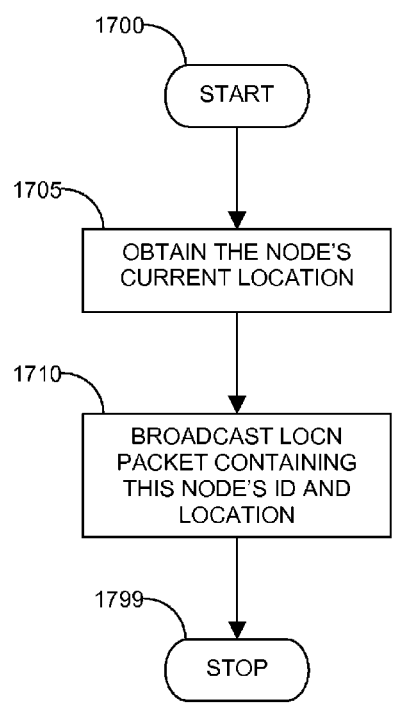
Figure 18:
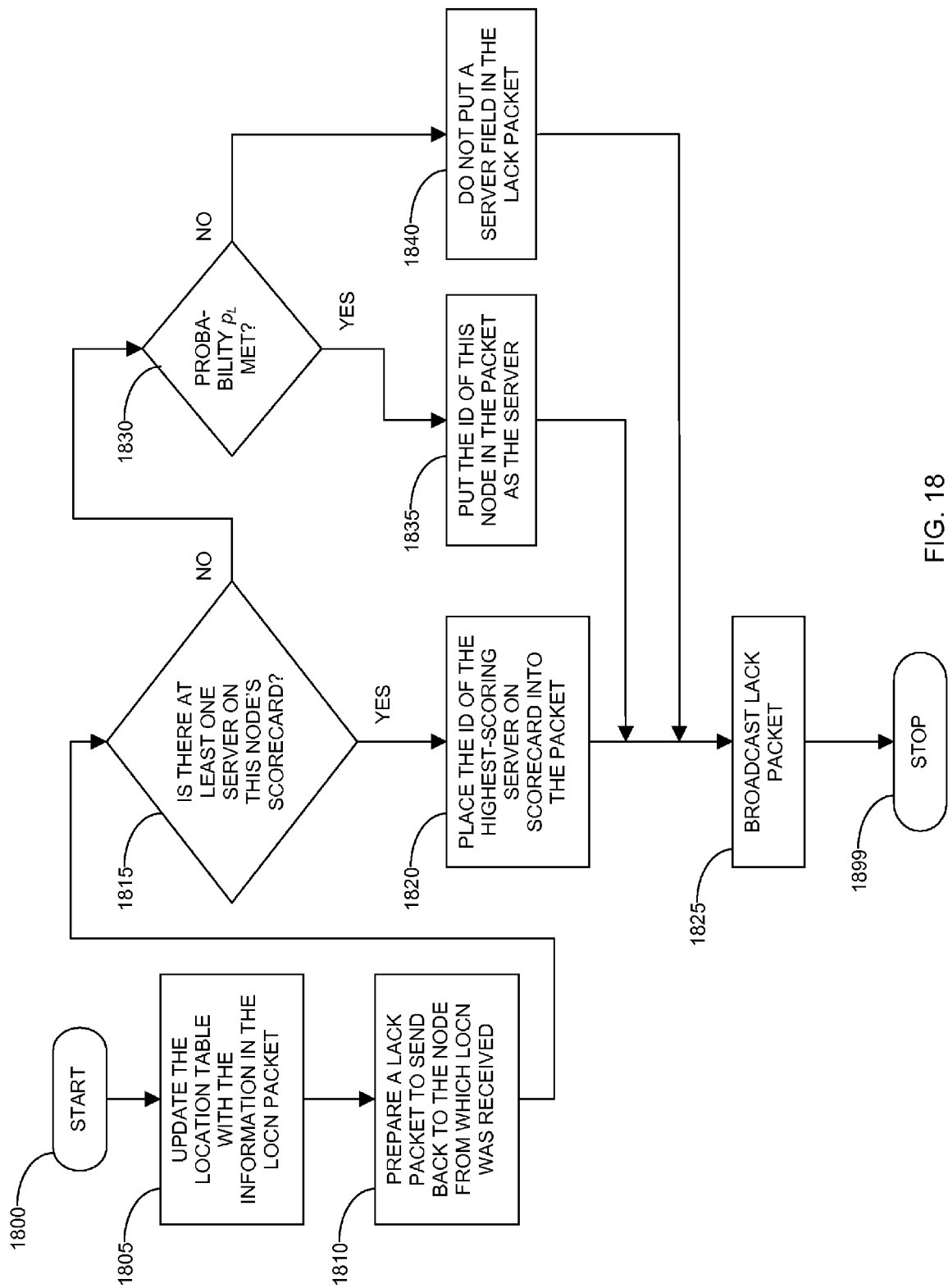
Figure 19:
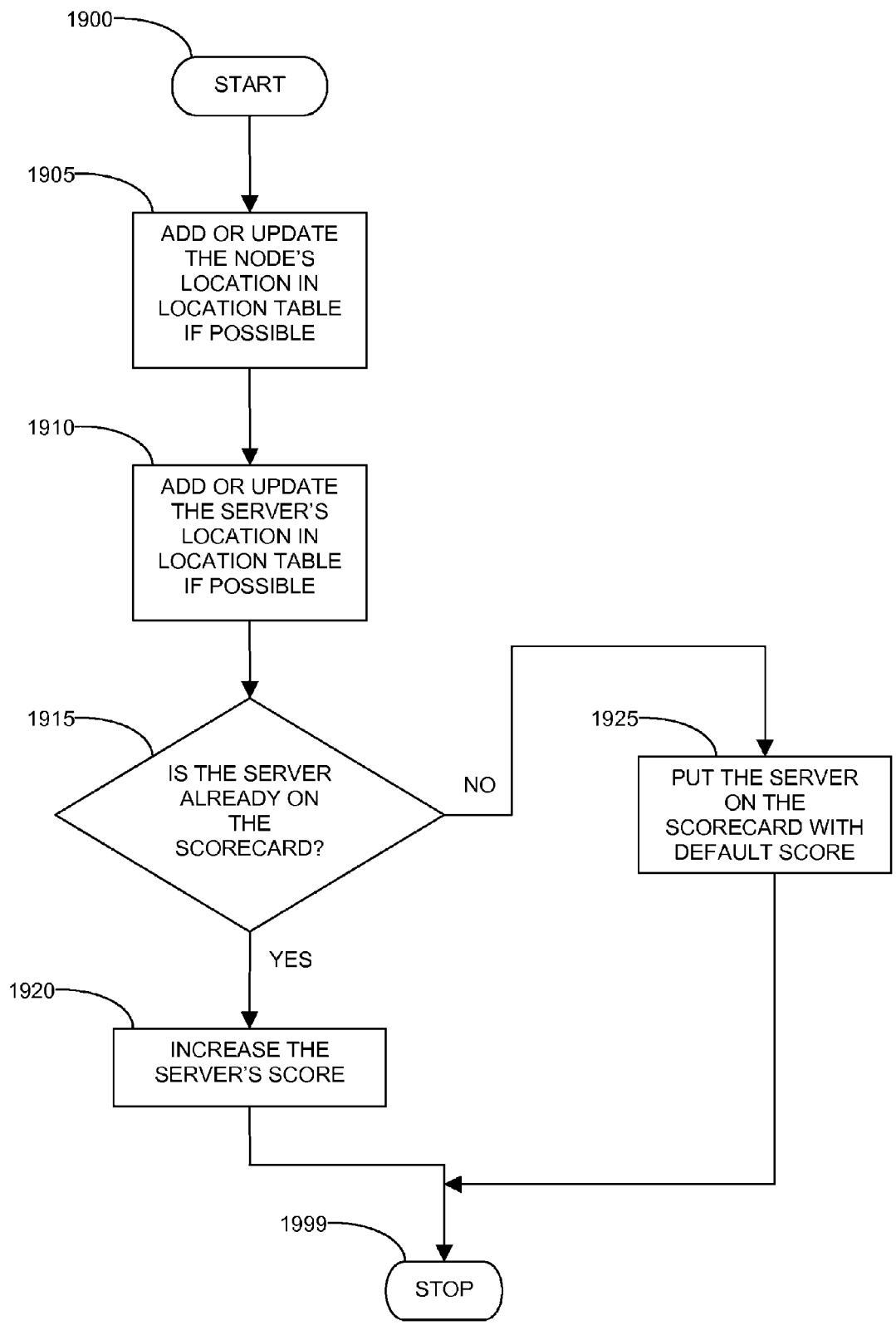
Figure 21A:
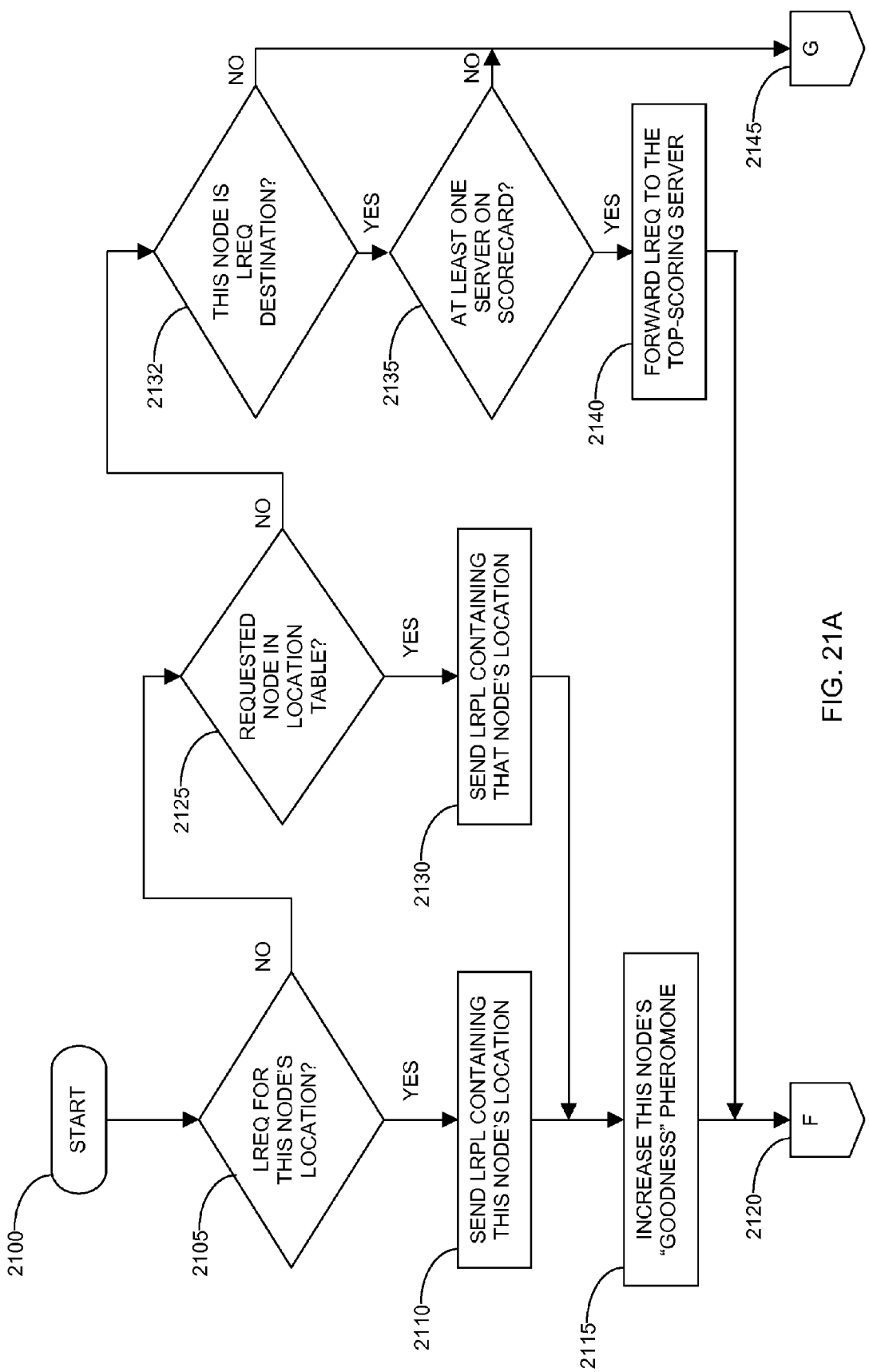
Figure 22:
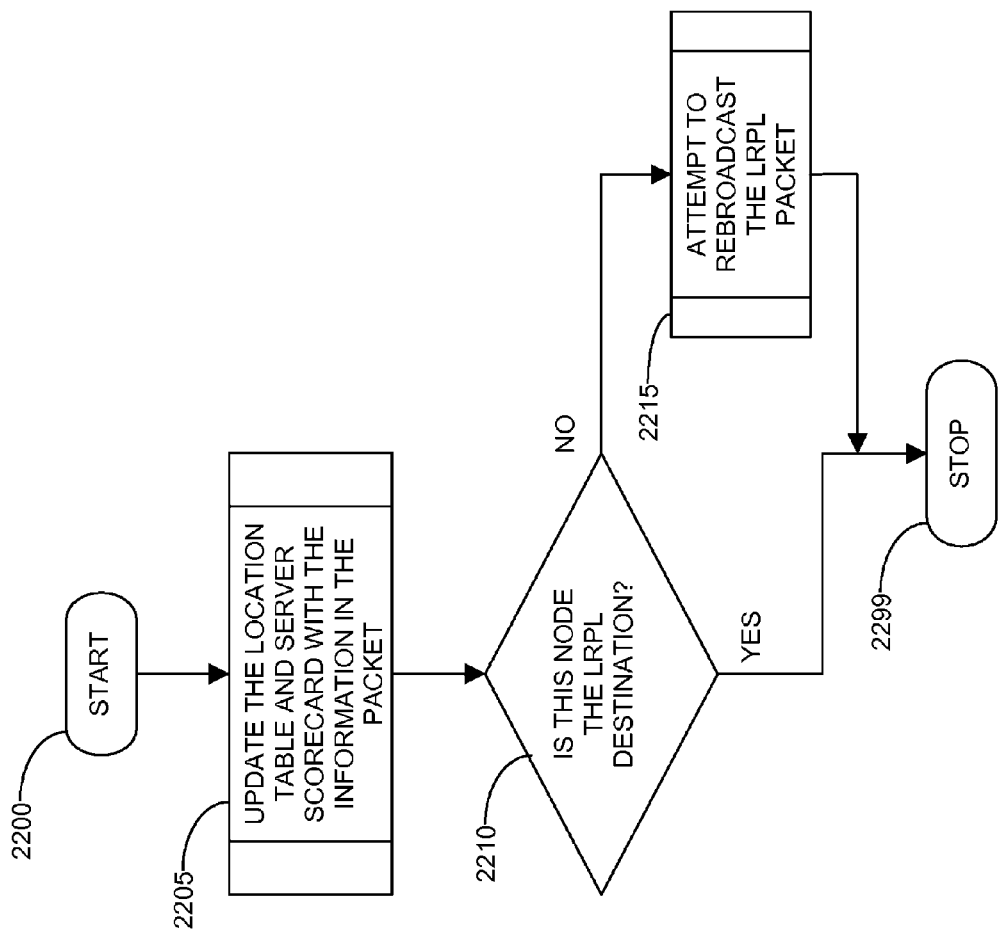
Figure 21B:
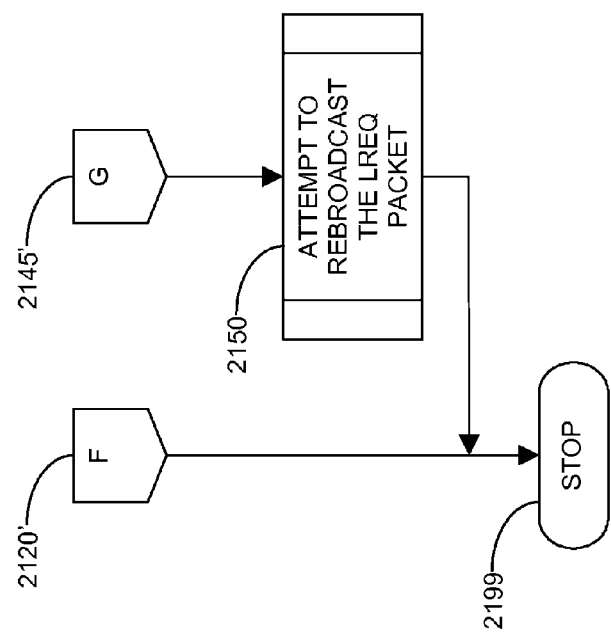

The structure, operation, and advantages of the present preferred embodiment of the invention will become further apparent upon consideration of the following description taken in conjunction with the accompanying drawings, wherein:

FIG. 1A is a schematic illustration of an exemplary MANET (mobile ad hoc network) in a military situation;

FIG. 1B illustrates node to node hopping behavior for communications in a MANET;

FIG. 1C is a schematic representation of functional elements in a communication device suitable for use as a node in a MANET;

FIG. 1D illustrates a spatial configuration of nodes from which must be selected a best neighbor for relaying communications according to the invention;

FIG. 2 is a flow chart/state diagram showing top level, interrupt driven control of a Swarm Autonomous Routing Algorithm (SARA) according to the invention;

FIGS. 3A and 3B are a flow chart of a SARA Packet Handling Algorithm according to the invention;

FIG. 4 is a flow chart of a SARA Learning Algorithm according to the invention;

FIGS. 5A and 5B are a flow chart of a SARA Attempt Rebroadcast Algorithm according to the invention;

FIG. 6 is a flow chart of a SARA Calculating Goodness Delay Algorithm according to the invention;

FIG. 7 is a flow chart of a SARA Get Best Neighbor Using Location Algorithm according to the invention;

FIG. 8 is a flow chart of a SARA Packet Broadcasting Algorithm according to the invention;

FIG. 9 is a flow chart of a SARA Acknowledgement Waiting Algorithm according to the invention;

FIG. 10 is a flow chart of a SARA Pheromone Decay Algorithm according to the invention;

FIG. 11 illustrates a spatial configuration of zone partitions for use by a Destination Zone Routing (DZR) Algorithm according to the invention;

FIG. 12 illustrates a MANET configuration wherein a "dead zone" lies in the way of simple directional routing;

FIG. 13 is a flow chart of a DZR Learning Algorithm according to the invention;

FIG. 14 is a flow chart of a DZR Finding Best Neighbor Algorithm according to the invention;

FIG. 15 is a flow chart of a Destination Pheromone Learning (DPL) Learning Algorithm according to the invention;

FIG. 16 is a flow chart of a DPL Finding Best Neighbor Algorithm according to the invention;

FIG. 17 is a flow chart of a Swarm Location Service (SLS) Initialization Algorithm according to the invention;

FIG. 18 is a flow chart of an SLS LOCN Packet Processing Algorithm according to the invention;

FIG. 19 is a flow chart of an SLS LACK Packet Processing Algorithm according to the invention;

FIG. 20 is a flow chart of an SLS Obtaining Location Information Algorithm according to the invention;

FIGS. 21A and 21B are a flow chart of an SLS LREQ Packet Processing Algorithm according to the invention;

FIG. 22 is a flow chart of an SLS LRPL Packet Processing Algorithm according to the invention; and FIGS. 23-27 are graphical plots of MANET communication performance test results for SARA compared to other prior art routing algorithms.

DETAILED DESCRIPTION OF THE INVENTION

Glossary acknowledgement—the act of notifying a sender that a packet it sent was received.
acknowledgement packet—a protocol packet sent for the purpose of notifying a sender that a packet it sent was received.
active learning—a method of gathering and calculating information about a network by periodically broadcasting and receiving protocol packets requesting such information. (see passive learning)
address—an identifier (ID), preferably unique, that refers to a particular node (device) in a network.

Ad hoc On-demand Distance Vector (AODV)—an IETF standard method for routing packets of data in a MANET by establishing a route to a destination only when it is needed.

bidirectional link—the case that occurs when a nonzero transmission pheromone and a nonzero receiving pheromone exist between two nodes, meaning that the two nodes can receive one another's transmissions clearly.

broadcasting range—a measure of the maximum distance from a transmitter that a receiver can be located and still successfully receive signals from the transmitter.

buffer—a temporary storage area.

cellular network—a network made up of a collection of cells, each of which is covered by the broadcasting range of a fixed transmitter (and receiver).

COTS—Commercial off the Shelf, a term for ready-made products that are available for purchase by anybody.

communication packet—same as a packet. The qualifier is employed to emphasize the use of the packet for communicating information in a network of (communication) nodes.

data packet—a packet that contains data relevant to the user of a network; compare "protocol packet."

data rate—the speed at which data can be sent on a network.

dead zone—a region of the area covered by a network in which communication cannot take place, either because no nodes are located there or because environmental effects, such as interference, prevent effective communication.

designated node—the node determined by SARA that should rebroadcast a packet upon receiving it, in order to route it toward its destination.

destination pheromone—a pheromone indicating the goodness of choosing a particular neighbor to send to a destination.

Destination Pheromone Learning—a method used by SARA to make routing decisions by maintaining pheromones corresponding to each neighbor of a node and each possible destination node in the network.

Destination Zone Routing—a method used by SARA to make routing decisions by grouping destination nodes into zones based on their geographical location and maintaining pheromones corresponding to each neighbor of a node and each zone.

DPL—Destination Pheromone Learning.

DSR—Dynamic Source Routing.

Dynamic Source Routing—an IETF standard method for routing packets of data in a MANET by establishing a route to a destination only when it is needed and inserting that route into the header of the packet.

DZR—Destination Zone Routing.

emergent system—a system of simple entities with simple behaviors, the combination of which forms a complex system capable of exhibiting complex behaviors.

exponential pheromone decay—pheromone decay in which the decay function is the product of the current pheromone value and a decaying exponential function.

flooding—a method for sending packets in which every node sends every packet to each of its neighbors.

GIG—Global Information Grid, a military term referring to a global collection of devices, people, and systems that convey information to warfighters and other personnel.

goodness—a numerical representation of the fitness of something for a particular purpose.

goodput—a measure of the fraction of packets sent by a source node that reach their destination.

Global Positioning System—a utility for finding a device's geographical location using a network of satellites.

GPS—Global Positioning System.

header—the portion of a packet that contains information used by the networking software or hardware, but that is not immediately useful to a user.

hop—the action taken by a packet that is transmitted from one node to an adjacent node.

IEEE 802.11—a standard created by the Institute of Electrical and Electronics Engineers that specifies how nodes in a wireless network with relatively high data rates should operate.

IEEE 802.15.4—a standard created by the Institute of Electrical and Electronics Engineers that specifies how nodes in a wireless network with relatively low data rates and low energy requirements should operate.

IEEE 802.16—a standard created by the Institute of Electrical and Electronics Engineers that specifies how nodes in a wireless network with relatively high data rates should operate.

IETF—Internet Engineering Task Force, an organization that develops and promotes standards for computer network communication.

infrastructure—the organization and/or location of devices in a network.

LAR1—Location-Aided Routing, a method for routing packets of data in a MANET by establishing zones based on nodes' geographical locations, and flooding data in the direction of the zones.

learning—the process of incrementing and decrementing (increasing and decreasing) pheromones as appropriate, either over time or when packets are sent and received.

linear pheromone decay—pheromone decay in which the decay function is a linear function of the current pheromone value.

location server—a node that listens for requests for the locations of nodes and responds to those requests.

location service—a method for providing the physical (geographical) locations of nodes in a network to nodes that need the information to make routing decisions.

location table—a table containing one or more entries, where each entry contains the address of a node, its geographical location, and possibly its maximum broadcasting range.

M2M—Machine-to-Machine, a term that refers to communication between one machine and another.

MANET—Mobile Ad hoc Network, a network of mobile devices that communicate wirelessly with one another forming an arbitrary topology.

message—a generic term for a piece or grouping of information that is communicated between communication devices. Usually, but not necessarily, a packet. Can also refer to a grouping of information that is so large that it must be communicated by means of more than one packet.

message packet—a packet containing a payload of information that is useful to a user, especially when the payload contains a digitized communications message, e.g., digital audio. Also a data packet.

neighbor node (neighbor)—a second node that is capable of receiving a first node's broadcasts; i.e., a neighbor of a first node is within the first node's (maximum) broadcasting range.

network diameter—the average distance between any two nodes in a network.

network traffic—the flow of packets around a network.

node—a device in a network that is capable of communicating with other devices in the network.

overhead—information sent on a network that is not directly relevant to the user, such as protocol packets, node location and routing information.

packet—a grouping of information that is being sent on a network, usually including a header and payload. Sometimes called a communications packet or a message packet, regardless of the type of packet (also see protocol packet, data packet)

passive acknowledgement—a method wherein a first node receiving a copy from a neighbor of a packet previously sent by the first node is considered to be an acknowledgement that the neighbor received the packet previously sent by the first node.

passive learning—a method of gathering and calculating information about a network solely through passive listening. (see active learning)

passive listening—a method by which a node processes packets it receives even when the packets are not intended to be sent to that node.

path—the sequence of nodes a packet visited on its way from a source node to a destination node.

payload—the portion of a packet that contains data important to the user.

pheromone—an odoriferous chemical produced by an organism that is deposited into the organism's environment as a method of communicating information to other organisms. The amount and type of the chemical conveys different messages, and the chemical evaporates over time, losing its strength. In a computer program, artificial "pheromones" are implemented as variables that have numerical values analogous to amounts of a pheromone chemical. Differently named variables are analogous to different types of pheromone chemicals.

pheromone decay—the process by which a chemical pheromone evaporates and loses its strength; or analogously the process by which an artificial pheromone's value is decreased over time.

pheromone decay function—a mathematical function used to calculate a decreased value for an artificial pheromone.

pheromone increase function—a mathematical function used to calculate an increased value for an artificial pheromone.

pheromone table—a table containing one or more entries, each of which contains the address of a node and the values of one or more pheromones associated with that node.

ping—a small packet that is periodically sent to a device on a network to determine its status.

protocol—a formal description of the message formats used and the actions taken by devices that communicate with one another.

protocol packet—a packet that is sent by a network protocol for its own use, without including any data (payload) immediately useful to the user of the network.

QualNet—a computer program used to simulate communication scenarios and produce statistics about various routing algorithms and other communication parameters.

rebroadcast—the action of broadcasting a packet after it has been received.

rebroadcast probability—the probability that a non-designated node will rebroadcast a packet upon receiving it.

receiving pheromone—a pheromone associated with a node and its neighbor, the magnitude of which indicates how capable the neighbor is of receiving the node's broadcast packets.

RFID—Radio Frequency Identification, a technology for using radio waves to store and retrieve information that identifies objects.

route—the sequence of nodes a packet visits on its way from a source node to a destination node.

routing—the process of determining the sequence of nodes a packet should visit in order to reach a destination.

routing algorithm—a particular method for performing routing of packets in a network.

routing table—a table constructed and maintained by some routing algorithms that lists every possible destination node in the network and the sequence of nodes a packet would visit to reach each of those destinations.

SARA—Swarm Autonomous Routing Algorithm, a method for routing packets of data in a MANET inspired by the behaviors of social insects.

self-configuring—describes a system that is capable of performing tasks without requiring setup or configuration by a user.

self-healing—describes a system that is capable of detecting and repairing errors or points of inefficiency in the system without the intervention of the user of the system.

sensor network—a collection of sensors that communicate with one another and/or with other parts of a system, usually through wireless communications.

SLS—Swarm Location Service.

Swarm Location Service—a method for providing locations of devices in a network to other devices in the network, using principles of swarm intelligence.

stigmergy—the action of modifying the environment in some way (e.g., by depositing pheromones) in order to communicate with others.

swarm intelligence—an artificial intelligence framework for designing systems that exhibit behaviors similar to social insects such as ants, bees, termites, or wasps.

SwarmSim—a computer program used to simulate communication scenarios and produce statistics about SARA.

transmission pheromone—a pheromone associated with a node and its neighbor, the magnitude of which indicates how capable the neighbor is of transmitting broadcast packets to the node.

Overview

The desire for ubiquitous communication among nodes in mobile ad hoc networks (MANETs) demands new paradigms for routing, location service, and node design. The inventor(s) have developed novel algorithms based on swarm intelligence that are distributed, self-organizing, self-healing, and which place relatively low demands on a nodes processing capability, memory size, broadcast range, and power demand. Unique products are being designed with modules using low-power embedded microcontrollers to run the algorithms. These modules can be coupled with a vast array of communication devices, sensors and other equipment to suit a variety of applications.

A forward looking example of an application made possible by the present invention is a swarm-enabled sensor network for use in detection of improvised explosive devices (IEDs) on a battlefield. Effective identification of IEDs requires a reliable sensing device capable of quickly detecting a variety of chemical and biological agents from a distance and a method of communicating the information back to the warfighter. The assignee's planned Swarm Mobile Sensor Network (SMSN) can produce a map of IED coordinates and provide it to the warfighter via a handheld computer.

The present invention addresses MANET communication needs with novel product designs using routing protocols based on the behaviors of social insects (swarm intelligence). This approach provides for a self-forming, self-healing ad hoc network solution specifically designed for last mile connections, with scalability to hundreds of thousands of nodes, very low startup time, and much higher efficiency than IP-based routing. Important applications of this system include, but are not limited to, military and/or civilian wireless communications devices, sensor networks, and home and industrial automation means.

The inventive algorithms are based on the principles of swarm intelligence; they operate in a purely distributed manner using only local data (communicated over a short range). This allows the applications utilizing the inventive algorithms to be scalable to networks that are arbitrarily large. A unique passive acknowledgement technique is specifically designed to integrate seamlessly with connectionless (wireless) physical layer node devices. This alone provides for a dramatic improvement in routing efficiency, even when conventional physical layer devices are employed. Higher efficiency at the routing level translates into higher bandwidth delivered to the application, and longer on-station times for battery-powered equipment.

An analogy between food foraging behavior in ants and routing packets in a MANET can be drawn by considering the set of nodes in the network as the "environment" and the packets as "ants" in search of food. A node maintains tables of artificial "pheromones", the strengths of which are influenced by the communication packets that are sent and received by the node. Routing decisions are made by comparing the pheromone values. Using the swarm intelligence model as a basis for a routing solution, networks can exhibit many of the same qualities as social insect colonies, including individual node simplicity, network robustness, and self-organization. The present invention's solution for MANET routing is "SARA": a Swarm Autonomous Routing Algorithm.

While some prior art routing protocols require variable-length packet headers with several fields, a SARA data packet consists of a simple header and the payload data. By using a small header, SARA retains its simplicity, and can operate consistently across different network sizes and traffic amounts.

The swarm routing algorithm naturally incorporates many of the features typically implemented in the medium access control (MAC) layer of communication, such as passive listening, conflict resolution, and collision avoidance. Therefore, only a simple MAC protocol is necessary. This frees up memory on embedded systems.

Recent research has shown that incorporating geographical location information into routing algorithms can increase efficiency and provide features impossible to provide using non-location-aware algorithms. The ability to locate a particular node, and the ability to send a message to a group of nodes within a geographical region (referred to as "geocasting") has many applications. Knowing a mobile node's location can help to determine its identification and affiliation. Furthermore, by making location information constantly available, it becomes possible to track nodes, where they have been, and where they are going. Examples of methods/means for nodes to learn their own locations are: by using GPS, by being preprogrammed, or by using received signal strengths to triangulate their positions relative to other nodes. This location information can then be communicated to other nodes using an inventive Swarm Location Service (SLS) algorithm, also disclosed herein. The SLS algorithm does not rely on centralization or fixed infrastructure, but instead uses the dynamic nature of the MANET to its advantage. This approach deals well with a heterogeneous collection of nodes, some of which may not be location-aware.

Although the inventive algorithms disclosed herein are applicable to classic networks (e.g., wired connections between relatively fixed nodes, communications between mobile nodes and fixed base stations, etc.), they are most advantageously employed in the challenging MANET environment. Therefore the detailed disclosure of the inventive algorithms that follows is presented with respect to preferred MANET embodiments which should not be considered as limiting the scope of any claimed invention(s).

Mobile Ad Hoc Networks

A mobile ad hoc wireless network (MANET) is a set of devices (nodes) capable of communicating with one another without relying on any type of fixed infrastructure. In other words, the devices may be randomly-placed, they may move about unpredictably, and they may enter or leave the network at any time. Typically, the broadcasting range of a node in a MANET is only a fraction of the overall network size. Thus, for a packet of information to be sent from a first node to another node outside of the first node's range, the packet must hop through one or more intermediate nodes, as described above with reference to FIG. 1B.

In a MANET, nodes communicate with one another by sending packets, which hop from one node to another until they reach their destination. The problem of routing in a MANET is the problem of finding a "good" sequence of nodes through which a packet should be sent to reach its destination. Many routing protocols have been proposed, but almost all of them rely on the construction and maintenance of a routing table, which contains an explicit list of nodes to traverse in order to reach each particular destination. This approach works very well in wired networks, but is inefficient in MANETs because the routing tables become outdated quickly. As nodes in the MANET move, join, and leave the network, routes become invalid and the protocols must work to repair them.

SARA's Approach to MANET Routing

The inventive Swarm Autonomous Routing Algorithm (SARA) works differently from other well-known MANET routing protocols in that it makes a routing decision at each hop the packet takes. This means it can adapt more quickly to a changing environment than the prior art protocols. Furthermore, SARA makes use of swarm intelligence techniques, likening the problem of routing in a MANET to the food-foraging behavior of ants. The advantages of swarm intelligence in optimization and control are well-known.

As ants travel to a food source, they lay down trails of odoriferous chemicals (pheromones), which serve as an indication to other ants that food can be found by following the pheromone path. As more ants follow the path, more pheromones are laid and the scent becomes stronger. If ants stop following a path, the pheromone evaporates and the scent becomes weaker, a process called pheromone decay. The term "stigmergy" refers to this process of modifying the environment to communicate between members of an emergent system.

An analogy between food foraging behavior in ants and routing data packets in a MANET can be drawn by considering the set of nodes in the network as the "environment" and the data packets as "ants" in search of food. Nodes maintain tables of artificial pheromones, the strengths of which are influenced by the packets that are sent and received by the node. Routing decisions are made by comparing the pheromone values. Before broadcasting a packet, a node designates what it considers the best neighbor node to rebroadcast the packet on the next hop. Using the swarm intelligence model as a basis for a routing solution, networks can exhibit many of the same qualities as social insect colonies, including individual node simplicity, network robustness, and self-organization.

The following variations of SARA will be described:

1. The basic routing algorithm, which is not aware of the geographic/physical locations of any nodes.
2. A destination pheromone learning (DPL) enhancement to the basic routing algorithm whereby non-location-aware nodes can make more intelligent routing decisions at the expense of a small increase in memory use.
3. A location-aware algorithm which uses geographical locations to make routing decisions. Node locations may be determined by any means, and a swarm location service (SLS) algorithm is used to communicate location information between location-aware nodes.
4. A location-aware algorithm using destination zone routing (DZR) wherein a node establishes a grid of geographic zones, and routes communications to a zone that encompasses the destination node.

Packet Types and Formats

The following types of packets are utilized by SARA:

Data Packets—contain data (e.g., message contents) being sent from a source node.
Acknowledgement ("ACK") Packets—broadcasted only by a destination node in order to indicate that rebroadcasting is not necessary.
Ping ("HELLO") Packets—used in active learning.
Location Service Packets—several types of packets that are described in the Swarm Location Service section hereinbelow.

Each packet consists of two fields: a header and a payload. The header of a packet contains information that is used by the algorithm to route the packets. Several pieces of information may be present in the header, but the following are required by SARA: (a) the type of packet (listed above), (b) identification of the packet's source node, (c) identification of the destination node for the packet, (d) a path list (a sequential list of the nodes (identifiers) that the packet has passed through from its source node to its current node, (e) the number of nodes in the path to the current node, and (f) a packet identification or sequence number.

For acknowledgement packets and ping packets, the payload field is empty. Ideally, the path list would be indefinitely long, but in reality this is impractical since it could lead to very large and indeterminate size packets. Therefore, a limit is imposed on the number of nodes in the path list. When the limit is reached, the oldest nodes are removed from the list to make room for the newer nodes. Of course the value of (e) "the number of nodes in the path" can continue to increment until a maximum value determined by the bit size of the number is attained.

Pheromones

For the purpose of our algorithm implementation, a pheromone is simply a numerical value. There are currently several types of pheromones in use by the inventive algorithms: transmission (TX) and receiving (RX) pheromones associated with a node's neighbors, zone (Z) pheromones used in destination zone routing, destination pheromones used in destination pheromone learning, and location server pheromones used in the location service. Each type of pheromone has an associated minimum value, an associated maximum value, a pheromone decay function, and a pheromone increase function wherein the two functions are used to update pheromone values by respectively decreasing or increasing the value of the pheromone. If $f_u$ denotes the pheromone increase function, then increasing a pheromone value is done according to the following equation (1) which is implemented, for example, as steps 430 and 440 in the Learning Algorithm illustrated in FIG. 4.

$$P' = \begin{cases} f_u(P) & \text{if } f_u(P) \leq P_{max} \\ P_{max} & \text{otherwise} \end{cases} \quad (1)$$

where P is the current pheromone value, P' is the new pheromone value, and $P_{max}$ is the associated maximum value. The act of limiting the value of P to $P_{max}$ is not shown as separate steps in the flow charts, but is instead shown as part of the pheromone increase function calculation step (e.g., 430, 440). As described hereinbelow, there are pheromone increase function calculation steps in other algorithms/flow charts as well. It will be seen that pheromone increasing is event driven, wherein the pheromone increase function is implemented whenever a predetermined event occurs.

Pheromones decay (i.e., their values decrease) according to a similar pheromone decay function, but the pheromone decay function is time driven, being implemented whenever a predetermined time delay expires. If $f_D$ denotes the pheromone decay function, then decreasing a pheromone value is done according to the following equation (2) which is implemented, for example, as steps 1015, 1025, 1030 and 1035 in the Pheromone Decay Algorithm illustrated in FIG. 10.

$$P' = P \begin{cases} f_D(P) & \text{if } f_D(P) > P_{min} \\ \text{remove } P & \text{otherwise} \end{cases} \quad (2)$$

where P is the current pheromone value, P' is the new pheromone value, and $P_{min}$ is the associated minimum value. To "remove P" is to eliminate the subject pheromone from the list or table of pheromone values. A less-preferred action is to simply limit the lowest value of the pheromone to the minimum value $P_{min}$ which is typically zero.

A wide variety of equations can be used for the pheromone increase function and pheromone decay function calculations. In general, an equation is selected that produces the desired pheromone change rate and dependency upon other variables. For example, a linear equation can be used that simply adds/subtracts a constant amount to/from the previous pheromone value whenever the pheromone is updated. More preferably a logarithmic equation is employed in order to produce rapid initial changes followed by a slower change rate. An example of such a logarithmic change equation used for the pheromone increase function is:

$$P' = \alpha * P_{max} + (1-\alpha) * P \quad (3)$$

where α (alpha) is a parameter having a relatively small value between 0 and 1, and the initial value of P is $P_{min}$.

Each node running SARA maintains a table of neighbor nodes containing n entries, where n is the number of neighbors of which the algorithm is currently aware. Each entry i in a node's neighbor node table is a database record that contains at least the following information (set of database record fields):

$N_i$, the identification (i.e., address or ID) of the neighbor associated with the table entry i.
$P_{TX,i}$, the transmit pheromone associated with neighbor $N_i$.
$P_{RX,i}$, the receive pheromone associated with neighbor $N_i$.
$t_{TX,i}$, a timestamp indicating the time when the value of $P_{TX,i}$ was last modified.
$t_{RX,i}$, a timestamp indicating the time when the value of $P_{RX,i}$ was last modified.

With reference to the Pheromone Decay Algorithm illustrated in FIG. 10, pheromone decay is periodically implemented by clock-generated interrupts (FIG. 2, steps 220, 225)

using a decay timer with fixed time period $t_D$, and a pheromone decay function $f_D$ that can be different for transmit pheromones versus receive pheromones. Thus there is a transmit pheromone decay function $f_{D,TX}$ and a potentially different receive pheromone decay function $f_{D,RX}$. When the decay timer expires after counting out the time period $t_D$ (step 1000), the current time t is compared to the timestamps $t_{TX,i}$ and $t_{RX,i}$, (steps 1010 and 1020, respectively) for each table entry i from 1 to n (step 1005). If the difference for either is greater than $t_D$, the appropriate pheromone value is assigned a new value according to the transmit pheromone decay function $f_{D,TX}$ (step 1015) and the receive pheromone decay function $f_{D,RX}$ (step 1025) as summarized in equation (2). Step 1030 checks the updated pheromone values $P'_{TX,i}$ and $P'_{RX,i}$, and if both have fallen below their respective minimum values $P_{TX,min}$ and $P_{RX,min}$, then the entire record/table entry i of the transmit and receive pheromones for the $i^{th}$ neighbor node is removed from the pheromone table (step 1035).

Although the pheromone decay function may theoretically take any form, in practice the following two forms are particularly useful:

$$f_D(P) = P - P_D \quad (4)$$

$$f_D(P) = Pe^{\tau_D} \quad (5)$$

Equation (4) represents linear pheromone decay, whereby pheromone values are decremented by a fixed decay amount $P_D$ at fixed intervals. Equation (5) represents exponential pheromone decay, where the pheromone values decrease exponentially according to the factor $_{\tau D}$, which may include the time variable t.

The pheromones used by the DZR, DPL, and SLS algorithms also decay according to essentially the same method; however, each pheromone type may have a different decay function equation.

Data Structures

The following data structures are required for the algorithm:

(a) Table of Neighbor Nodes: For each node i that is known to be within the current node's broadcasting range there is an $i^{th}$ entry (record) in the table of neighbor nodes containing the pheromone-related information fields associated with the $i^{th}$ neighbor node as detailed above. The pheromone values in the $i^{th}$ table entry both decay and are increased according to the methods of SARA.

(b) Acknowledgement Waiting Buffer: Contains packets that are waiting for acknowledgements and a counter indicating how many times the node has attempted to broadcast the packet.

(c) Seen Packets Buffer: Contains a list of the packets that have been seen by the current node. The entire packet does not need to be stored; only enough information to distinguish it from other packets (e.g., a packet sequence number, checksum, source and destination, etc.) is needed.

The following data structures are optional, and are used only for certain versions of the algorithm:

(d) Destination Zone Routing Table: If destination zone routing is in use, a table containing pheromones for each neighbor relative to destination zones is maintained. This is described in detail in a Destination Zone Routing section hereinbelow.

(e) Location Table: If node locations are available (e.g., when the swarm location service algorithm is in use), then the node maintains a location table containing node IDs, geographical locations, and broadcasting ranges. This is described in detail in a Swarm Location Service section hereinbelow.

(f) Location Server Scorecard: If the swarm location service algorithm is in use, then the node maintains a table ("scorecard") containing a node ID and a pheromone (score) indicating the "goodness" of asking that node for location information. This is described in detail in the Swarm Location Service section hereinbelow.

Algorithm Parameters

In order to customize the algorithms of SARA for different types of nodes and networks, there are several user-configurable parameters that affect how the algorithm operates. The following parameters are preferably stored on each node:

(a) Rebroadcast Probability, $p_r$: The probability that a non-designated node will rebroadcast a packet upon receiving it; see FIG. 3B.

(b) Fixed Delay, $T_{fixed}$: The minimum amount of time a node will wait before broadcasting a packet based on "goodness;" see FIG. 6.

(c) Maximum Goodness Delay, $T_{goodness}$: The maximum amount of "goodness" delay that can be calculated by the expression in step 625 of the algorithm illustrated in FIG. 6.

(d) Maximum Random Delay, $T_{random}$: The maximum random delay used by the expressions in steps 365 and 625 of the algorithms illustrated in FIGS. 3B and 6.

(e) Maximum ACK Delay, $T_{ACK}$: The maximum random delay allowed before sending an ACK packet; see step 355 of the algorithm illustrated in FIG. 3B.

(f) Pheromone Decay Period, $t_D$: The period (length of time) of the decay timer as used to calculate pheromone decay according to the decision steps 1010 and 1020 of the algorithm illustrated in FIG. 10.

(g) Maximum Broadcast Retries: The maximum number of times to retry broadcasting a packet before discarding the packet; see the decision step 920 of the algorithm illustrated in FIG. 9.

(h) Maximum ACK Waiting Packets: The maximum number of packets that can be waiting in the acknowledgement waiting buffer; see the algorithm illustrated in FIG. 9. Ideally this maximum number would be a very large number, but in reality is constrained by available memory.

(i) Maximum Seen Packets: The maximum number of packets the node can store in the buffer of seen packets. Ideally this would be a very large number so that the node can remember every packet it has ever seen. In reality, the maximum number is constrained by available memory.

(j) Maximum Number of Neighbors: The maximum number of other nodes that the current node can store in its table of neighbors and neighbor pheromones. Ideally this maximum number would be a very large number so that the node can store information for an unlimited number of neighbor nodes. In reality, the maximum number is constrained by available memory.

There are additional parameters (described hereinbelow) that are specific to the destination zone routing, destination pheromone learning, and location service portions of the algorithm.

With reference to flow charts in the figures of the drawing, a detailed description will now be presented for operation of SARA in a representative "current node" (e.g., device 160). Of course SARA should also be operating in every other node in the MANET that is to participate in the MANET communications.

Routing Algorithm Detailed Description

The overall operation of the inventive swarm autonomous routing algorithm SARA is first of all illustrated by the hybrid flowchart and state diagram in FIG. 2. The state diagram elements are needed because several procedures (algorithms) in SARA are event/state-triggered algorithms that consequently run asynchronously relative to other algorithms that are included in SARA. FIG. 2 will be referenced at various points in the present disclosure as is appropriate for the particular events being considered.

An important and fundamental operation of SARA is illustrated in FIGS. 3A-3B. When the (current) node receives a communications packet (as determined by the interrupt routine in FIG. 2 step 215), the SARA routing procedure illustrated in FIGS. 3A-3B is called, and the node first processes the packet to facilitate learning (step 305). The learning process step 305 is carried out by calling a learning algorithm illustrated in FIG. 4. After learning from the packet, the algorithm checks (step 310) to see if the packet can be considered an acknowledgement for a previously-sent packet (i.e., "is the packet in the acknowledgement waiting buffer?"). If YES, then that packet is removed from the buffer containing waiting packets (step 315), and the routine is done (step 399). If NO, the algorithm checks to see if the packet has been seen before (step 325). If YES, then any necessary action has already been taken and the packet can be ignored, ending the routine (step 399). If NO (this is a new packet), it is saved to the seen packets buffer (step 330). If the location service is being used, the packet type is checked to see whether it is a location service (SLS) packet (step 335). If it is, step 340 calls the location service algorithm illustrated by the flow charts in FIGS. 18, 19, 21A-21B, and 22. Thus step 340 must direct the process call according to the type of SLS packet that is detected by step 335. There is a separate routine for each of the four SLS packet types: LOCN, LACK, LREQ, and LRPL. These packets and corresponding packet processing algorithms are fully described below in the SLS section of this description. After the SLS packet processing step 340, is a connection point B (345) which is also skipped to from step 335 if the packet is not a location service packet. Connection B (345) leads to the corresponding connection B (345') in FIG. 3B and thence to step 350 wherein the packet is examined to determine whether the current node is the packet's destination. If YES, then no further routing is necessary. Instead, the algorithm simply broadcasts a special ACK (acknowledgement) packet after a random time delay (step 355). The broadcast time delay $T_B$ is determined by generating a random fractional value r between 0 and 1 inclusive, and then multiplying the maximum ACK time $T_{ack}$ by the random fraction r.

If the current node is not the destination, then it might be a designated rebroadcasting node for the packet, and this is tested in step 360. If YES, step 365 calculates a random delay time $T_B$ by generating a random fractional value r, and then multiplying the maximum random delay time $T_{random}$ by the random fraction r. After the random delay time elapses, the packet is rebroadcast in step 370 (by calling the attempt rebroadcast algorithm illustrated by the flow chart of FIGS. 5A-5B). Finally, even if the current node is not a rebroadcasting node designated in the packet, it can still rebroadcast the packet if a randomly generated number r falls below the Rebroadcast Probability $p_r$ parameter value as determined by step 375. If NO, the algorithm ends (step 399). If this probability is met, then a delay time $T_B$ based on "goodness" of rebroadcast is determined in step 380 that calls the algorithm illustrated in the flow chart of FIG. 6, after which the node attempts to rebroadcast the packet.

Passive and Active Learning

When a packet is received, it is examined and the method of the algorithm illustrated in FIG. 4 is used to facilitate "learning." The same learning algorithm is used for both what is called "passive learning" and what is called "active learning". The only difference in learning modes is that for active learning the packet was received in response to a protocol packet that was broadcast by the current node to request packets to be broadcast by neighbors. A node running SARA maintains a pheromone table containing a "transmission pheromone," $P_{TX,N_i}$, and a "receiving pheromone," $P_{RX,N_i}$, for every neighbor $N_i$ that the current node is aware of. $P_{TX,N_i}$ indicates how capable the current node is of receiving transmissions from neighbor $D_i$. $P_{RX,N_i}$ indicates how capable the neighbor $N_i$ is of receiving transmissions from the current node. These pheromone values are "learned" by examining packets that are received. Each packet contains a path list of length L, which lists the IDs of nodes in the path the packet has taken while traversing the network from the source node. A node ID appearing directly before the current node's ID (or last) in the path list indicates that the current node can receive from that node, so the appropriate $P_{TX,N_i}$ value is increased. A node ID appearing directly after the current node's ID indicates that that node is capable of receiving transmissions from the current node, so the appropriate $P_{RX,N_i}$ value is increased. The pheromones are increased according to the pheromone increase function $f_u$. If destination zone routing is in use, there is a learning procedure (detailed hereinbelow) to increase the DZR pheromones as well. Similarly, if destination pheromone learning is in use, there is a learning procedure (detailed hereinbelow) to increase the DPL pheromones.

Attempting Rebroadcast

If a node is not the destination for a packet, then the node may need to rebroadcast it. This algorithm is illustrated in FIGS. 5A-5B. Before a packet can be rebroadcasted, the algorithm attempts to find the best neighbor node to rebroadcast the packet for the next hop. If the destination is a neighbor node having a bidirectional link (i.e. a neighbor having both transmission and receiving pheromones greater than zero), then it clearly is the best neighbor and is made the designated node for broadcasting. Otherwise, the algorithm checks to see if Destination Zone Routing (DZR) is being used, and if so then the algorithm attempts to find a best neighbor using DZR, which algorithm is shown in FIG. 14. If DZR does not find a best neighbor, or if DZR is not in use, then the algorithm attempts to get the best neighbor using location information, which algorithm is shown in FIG. 7. Then if location information is not available, or no best neighbor is found using location information, then the algorithm attempts to get the best neighbor using Destination Pheromone Learning (DPL) which algorithm is shown in FIG. 16. Finally, if DPL is not in use or no best neighbor is found using DPL, then the algorithm examines the current node's pheromone table to find all neighbors that have a bidirectional link, and then randomly chooses one of them to be the "best neighbor". If there are no bidirectionally linked neighbors, then as a last resort the packet is simply rebroadcasted without designating a best neighbor. The algorithm for broadcasting a packet (step 560) is shown in FIG. 8.

Calculating the "Goodness" Delay

When a node that is not the designated rebroadcaster for a packet decides for other reasons to rebroadcast a received packet, it waits for an amount of time called the "goodness delay" before rebroadcasting it. The goodness delay is calculated using the algorithm illustrated in FIG. 6. If the node that previously broadcasted the packet is within range—$R_p$—of the destination, there is little need for the current node to rebroadcast, so it will wait a longer time in order to let the packet reach the destination from the previous node. Otherwise, if the current node is within range—$R_{cur}$—of the destination then a short amount of time is passed before rebroadcasting, since the current node is likely to be the last hop for the packet before the destination. If neither of these cases occur, then the amount of time the node waits to rebroadcast is proportional to the fraction of the distance—$D_{cur,d}$—that the current node (cur) can cover given its broadcasting range—$R_{cur}$—. In addition, a random fraction r in the range of 0 through 1 is generated and multiplied times the max random time delay $T_{random}$ and added to the broadcast delay time $T_B$. Use of the goodness delay is a novel feature of the present invention that provides many advantages over the prior art, among them reduction of network overhead/excess broadcasting traffic.

Getting the Best Neighbor Using Location Information

If a node knows the locations of its neighbors and the destination, then the algorithm in FIG. 7 can be used to determine a best neighbor for rebroadcasting. First, the node identifies those neighbors that lie on bidirectional links. For each of those neighbors b, the node calculates the distance—$D_b$—the packet would need to travel to reach the destination after that neighbor b rebroadcasted the packet. If any of these distances—$D_b$—is less than the neighbor's broadcasting range $R_b$, that indicates that the neighbor b is within range of the destination. If this is the case, the best neighbor is found by determining which of those neighbors is the most "in line" with the line drawn between the current node and the destination. Referring to FIG. 1D, for a current node 170 and a destination node 175 that is outside the broadcast range 190, the best of the neighbors 180, 185 is the node 185 because its angle $\theta_2$ is less than node 180's angle $\theta_1$. If there are no neighbors that are one hop away from the destination, then the best neighbor is picked by choosing the neighbor with the least distance remaining between it and the destination, or as shown in FIG. 7 step 735, choosing the neighbor with the least remaining distance $S_b$ from the neighbor's broadcasting range $R_b$ to the destination node.

Broadcasting a Packet

When a packet is broadcasted, there is a chance it will not reach the next hop due to interference, node mobility, or other reasons. Therefore, before broadcasting a packet, a copy of it is saved to an "acknowledgement waiting buffer". The node then starts a timer and broadcasts the packet. This procedure is shown in FIG. 8. If the timer expires (monitored by the interrupt routine shown in FIG. 2) without hearing an acknowledgement of receipt (either implicit or explicit with an ACK packet), then the algorithm illustrated in FIG. 9 is followed (step 235) to retry broadcasting the packet. If a maximum number of retries is met, the packet is removed from the buffer and discarded.

Active Learning

If active learning mode is in use, the node periodically broadcasts a "ping" packet containing its identification. This packet contains no data payload, but is simply used to facilitate learning.

Originating Data Packets

If a node is the source of a data packet, then the same process as shown in FIGS. 5A-5B is used (called by step 230 in the FIG. 2 interrupt routine) to determine a best neighbor for broadcasting/sending the packet.

Destination Zone Routing

When SARA is location-enabled, Destination Zone Routing (DZR) may be used. DZR is a technique that allows the swarm algorithm to learn about and use global information by passively listening to packets being sent on the network.

For DZR, the node partitions the network into a series of zones 1100 (designated zones 0-31 for example) with the node as the center 1105, as shown in FIG. 11. The zone sizes increase with increasing distance from the node. While the figure shows only 32 zones, there are a theoretically infinite number of possible zones. Due to memory constraints, however, the number of possible zones would be limited in a real-world implementation. Trigonometry can be used to calculate the zone ID from the location of a node.

Each node maintains a Destination Zone Routing pheromone table consisting of entries $P_{N,Z}$, where N is a neighbor of the node and Z is a zone ID. $P_{N,Z}$ denotes the destination zone pheromone between neighbor N and zone Z. A large value for $P_{N,Z}$ indicates that packets sent to nodes in zone Z via neighbor N are likely to reach their destination. A small value indicates that N is not a good neighbor to send packets to nodes in zone Z. These pheromones are "learned" through passive listening to packets on the network, and their values decay over time using the pheromone decay mechanism.

Referring to FIG. 13, for passive learning in DZL: When a node receives a packet, the following actions take place:
1. The packet is examined to determine:
   S, the original source of the packet (step 1310)
   N, the ID of the neighbor from which the packet was received (step 1315)
2. Based upon the geographical location of S, the node determines the zone, Z, in which S is located. (step 1320)
3. The node increments $P_{N,Z}$ using a pheromone increase function.

For example, suppose a source node, S, needs to send a data packet to a destination zone, D. Referring to FIG. 14, the following actions take place:
1. Based on the geographical location of D, node S determines the zone, Z, in which D is located.
2. Node S checks the DZR table entry for zone Z, and determines the neighbor N with the highest DZR pheromone.
3. Node N is used as the designated node to send the data packet.

Pheromone Value Updating

The amount by which the pheromone associated with a neighbor and zone is increased should reflect the "goodness" of using that neighbor to send to that zone. This could be accomplished by using a weighted sum of factors that affect whether the neighbor is a good neighbor for rebroadcasting. These could be any factors, but two useful ones include the average hop count of packets and the geographical distance from the neighbor to the destination. The best neighbor to select to send to a destination is the one physically closest to the destination, and/or the one that can send a message to the destination using the fewest intermediate hops. The following equation for the pheromone increase function $f_u$ reflects this:

$$f_u(P_{N,Z}) = P_{N,Z} + A\left(\frac{1}{h}\right) + (1-A)\left(\frac{1}{d}\right)$$

where h is the number of hops taken by the received packet, d is the distance between the neighbor and the destination, and A is a constant weighting factor in the range [0, 1]. If A=0, only distance affects the pheromone increase value. If A=1, only the hop count affects the increase value. When a packet is received from a neighbor, this equation is used to increase the appropriate pheromone in the DZR table. Other increase functions are also possible.

The importance of destination zone routing is that it allows a node to route around "dead zones," such as the oxbow-shaped lake 1215 in FIG. 12, while still using location information to reduce overhead. In the figure, simply forwarding data from node 1210 in the direction of the destination 1205 will not work in all cases, because there is a large area where no nodes lie. Destination zone routing allows a node to learn that it can reach a destination in a given zone by routing through a neighbor in a different direction, giving it the ability to learn about so-called "dead zones" in the network.

Destination Pheromone Learning

When SARA is not location-enabled and Destination Zone Routing cannot be used, it is still possible for nodes to accumulate global information using a similar technique called Destination Pheromone Learning (DPL). Nodes using DPL keep a table containing destination pheromones for each (neighbor, destination) pair the node currently knows. DPL is an optional feature of the algorithm (SARA) that is not required but can enhance performance. It allows non-location-aware nodes to make more intelligent routing decisions at the expense of a small increase in the amount of memory that is used at a node performing DPL. DPL does not require the large amount of memory that a traditional routing table would require. It also is built-up by passive listening, so it requires essentially no network overhead.

Destination Pheromones

Each node maintains a table consisting of pheromone entries $P_{N,D}$, where N is a neighbor of the node and D is a possible destination. $P_{N,D}$ denotes the destination pheromone between neighbor N and destination D. A large value for $P_{N,D}$ indicates that packets sent to destination D via neighbor N are likely to reach their destination quickly, while a small value indicates that neighbor N is not a good candidate for rebroadcasting a packet to D. These pheromones are "learned" through passive listening to packets on the network, and their values decay over time using the pheromone decay mechanism.

Learning

Referring to FIG. 15, when a node receives a packet, the following actions take place:

1. The packet is examined to determine:
   S, the ID of the original source of the packet (step 1505)
   N, the ID of the neighbor from which the packet was received (step 1510)
2. The node increments the pheromone $P_{N,S}$ (step 1515)

Effectively, this procedure takes advantage of the fact that, when a node A sends a packet and it meets another node B as an intermediate hop, that node B can be considered an intermediate hop for packets heading toward node A as their destination (i.e., in the "reverse path").

Sending a Packet

Referring to FIG. 16, when a source node, S, needs to send a packet to a destination D, the following actions take place:

1. Node S checks its destination table for the destination D, and determines the best neighbor N i.e., the neighbor that has the highest destination pheromone $P_{N,D}$.
2. Node N is used as the designated node to send the data packet.

Pheromone Value Updates

The amount by which the pheromone associated with a neighbor and destination is increased should reflect the "goodness" of using that neighbor to send to that destination. While many factors can influence this goodness, one important factor is the average number of hops that packets take to reach the destination if sent through that neighbor. The following pheromone increase equation emphasizes this:

$$f_u(P_{N,D}) = P_{N,D} + A/h$$

where h is the number of hops taken by a received packet and A is a constant. Other increase functions are also possible, which could take factors other than hop count into account (such as, for example, the link quality between the current node and the neighbor N).

Destination Zone Routing Versus Destination Pheromone Learning

The importance of destination pheromone learning is that it allows nodes to accumulate "global" information about the network without needing to store entire routing tables. Destination zone routing is similar, but is able to "compress" the table by using location information to lump nodes together that are located in the same zone. DPL could be useful for small nodes with limited hardware capabilities, such as those found in sensor networks or embedded systems, while DZR is suitable for location-aware nodes with more computational abilities.

Swarm Location Service

Motivation

In order to work more effectively, the inventive Swarm Autonomous Routing Algorithm (SARA) can use geographical location information. Specifically, in order to send a packet, a location-aware node using SARA may use its current location, the locations of each of its neighbor nodes, and the location of the packet's destination to determine a best next node for forwarding the packet toward its destination. A node may use any of several means to obtain its own location, such as GPS or triangulation based on radio signal characteristics, or the location may be hard-coded into stationary nodes. In order to obtain the locations of other nodes, it is necessary to implement a location service. This disclosure gives an overview of the design of a Swarm Location Service (SLS) that can be advantageously used with SARA, and may also be usable by other routing algorithms.

A location service for SARA should have the following characteristics:

1. It should efficiently and accurately provide a node with the location(s) it needs to make routing decisions.
2. It should be distributed, and should not rely on any special hardware or setup.
3. It should be self-configuring.
4. It should not introduce too much overhead.

SLS exhibits these characteristics, achieving them by using swarm intelligence techniques similar to those employed by the routing algorithm itself. Rather than designating certain nodes as location servers, the algorithm is capable of learning which nodes can provide location information quickly and accurately.

Overview of SLS

Nodes that are location-enabled have a location table, where each line corresponds to a node in the network and the line contains the node's geographical location and maximum broadcasting range. When a node needs to know the location of another node, it sends a request to a "location server" node and waits for a reply. Any node is capable of being a location server, meaning that no node must specifically be designated as a location server node. Instead, each node maintains a "location server scorecard," (like a pheromone table) on which it lists the nodes that can provide it location information and a score (like a pheromone) indicating how well that node answers requests. A request is sent to the highest-scoring node on the scorecard. When a node receives location information from another node, it increases the score for the node that provided the information. The scores decay over time using pheromone decay, in order to facilitate learning and adaptation. By using this process, nodes learn which nodes are good location servers. The algorithm naturally favors nodes capable of storing a large number of locations and nodes that can relay information quickly.

Data Structures

The following data structures are used by the location service algorithm:

Location Table: For each node in the network that the current node is aware of, a line is kept in the location table specifying that node's geographical location and maximum broadcasting range. The location may be specified using any coordinate system, provided all nodes use the same system. The units used to specify the broadcasting range are arbitrary, but again should be consistent. In addition, each line may contain an entry indicating the type of node described by the line: stationary, somewhat mobile, or highly mobile.

Location Server "Scorecard": Every node maintains a table containing an entry for each location server the node is aware of. The entry contains a "score," or pheromone, indicating the "goodness" of asking that node for location information, and a timestamp used in the pheromone decay process for the scores.

Packet Types and Formats

The following are packet types that are used by SLS, along with their contents.

Location Packet (LOCN)
  The ID of the source of the packet,
  The location of the source of the packet,
  The maximum broadcasting range of the source of the packet.
Location Acknowledgement (LACK)
  The ID of the source of the acknowledgement,
  The location of the source of the acknowledgement,
  The maximum broadcasting range of the source of the acknowledgement.
  The ID of a location server,
  The location of that location server,
  The maximum broadcasting range of that location server.
Location Request (LREQ)
  The ID of the node whose location is being requested.
Location Reply (LRPL)
  The ID of the node whose location was requested,
  The location of the node whose location was requested,
  The maximum broadcasting range of the node whose location was requested,
  The ID of the node sending the reply,
  The location of the node sending the reply,
  The maximum broadcasting range of the node sending the reply,
  An optional timestamp used in the scoring mechanism.

Algorithm Parameters

In order to customize the algorithm for different types of nodes and networks, there are some user-configurable parameters that affect how the algorithm operates:

Maximum Locations: The maximum number of entries in the location table. Ideally the node could store the location of every other node, but in reality the value is constrained by available memory.

Maximum Scores: The maximum number of entries in the scorecard. Again, this would ideally be infinite, but will actually be limited by memory.

Score Decay Period: The period used for pheromone decay of the scores.

Maximum Location Tries: The maximum number of times to request a location before giving up.

LREQ Timeout: The maximum amount of time to wait for a reply after sending a LREQ packet.

Initialization

When a node powers on, the process (procedure, algorithm) in FIG. 17 is performed, called by box 205 in FIG. 2. The node obtains its own location (step 1705), then broadcasts a LOCN packet (step 1710) to notify its neighbors of its location.

Processing a LOCN Packet

When a node receives a LOCN packet, it updates its location table with the information in the packet (step 1805) and sends a LACK packet back to the node that sent the LOCN (steps 1810, 1825) as shown in FIG. 18, called by box 340 in FIG. 3A. The LACK packet contains the node's location and the ID and location of a location server. If there is at least one server on the node's scorecard, the highest scoring server's information is placed into the LACK packet (steps 1815, 1820). If the scorecard is empty, there is a chance the node will insert itself into the packet as the location server (steps 1830, 1835). This happens if the probability $p_L$ is met. This is done in order to inform the node that sent the LOCN of the current node's location and to tell it about a possible location server.

Processing a LACK Packet

When a LACK packet is received, the procedure in FIG. 19 is performed, called by box 340 in FIG. 3A. The node receiving the LACK updates its location table with the location of the source (step 1905) and the server (step 1910) in the packet, and increases the score for the server specified (steps 1915, 1920, 1925).

Sending a Data Packet

FIG. 20 shows the procedure followed when a node needs to request a location. If the node does not know the location it needs (step 2005, also step 705 in FIG. 7), and there is at least one server on the node's scorecard (step 2015), then a location request (LREQ packet) is sent to the highest-scoring server (step 2020).

Processing a Location Request

FIGS. 21A-21B show the procedure followed by a node that receives a location request (LREQ packet). The node may or may not be destination for the packet. Either way, if the node knows the location of the node requested (steps 2105, 2125), it will send a reply (LRPL packet) (step 2110 or 2130). If the node is the destination for the packet but it does not know the location requested, it forwards the packet to its top-scoring location server (step 2140), but if there aren't any location servers on its scorecard (step 2135), then it will simply attempt an undesignated rebroadcast of the LREQ packet (step 2150).

Processing a Location Reply

When a location reply (LRPL packet) is received, a node can use the information contained in the packet to passively learn locations of the requested node and of the replying server node (step 2205, calling FIG. 19) even if the node is not the destination (step 2210). This procedure is shown in FIG. 22.

Mobility Types

In addition to location information, a node using the location service may store and communicate information indicating how mobile the node is. If a node is stationary, then its location never changes; once a node learns its location it should never need to update it. If a node is mobile, but does not move often, the location will change infrequently. If a node is highly mobile, very frequent updates may be necessary. This information can be used to reduce unnecessary overhead by requesting the locations of only those nodes whose locations change.

Scoring Mechanism

The scores on the scorecard should indicate the "goodness" of asking a node for location information. Since it is desirable to ask nodes that provide up-to-date information quickly, the score increment should reflect the speed of response (i.e., the difference between the time when a LREQ is sent and a LRPL is received) and the age of the information (i.e., the difference between the timestamp in the LRPL and the current time).

The speed of a location node answering a request may be quantified by $\Delta t_D$, defined by:

$$\Delta t_D = t_{arrival} - t_{LREQ}$$

where $t_{arrival}$ is the time a LRPL arrives, and $t_{LREQ}$ is the time the LREQ was sent. It is desirable for $\Delta t_D$ to be a small value.

The age of location information may be quantified by $\Delta t_A$, defined by:

$$\Delta t_A = t - t_{timestamp}$$

where t is the current time and $t_{timestamp}$ is the timestamp contained in the LRPL that arrived. Again, it is desirable for $\Delta t_A$ to be a small value. It should be noted that, in order to reliably calculate the value $\Delta t_D$, the nodes must have synchronized clocks. If this is impractical then the score may be based solely on $\Delta t_D$, or a different scoring mechanism may be used.

Using these quantities, the score, S, for a location node may be given by:

$$S = \frac{w}{\Delta t_D} + \frac{1-w}{\Delta t_A}$$

In this equation, w is a constant "weight" that may be given as an algorithm parameter; alternatively, a satisfactory value may be determined by experimentation. Notice that if w is close to 1, then nodes that supply information quickly will be favored; this may be desirable for networks of mostly stationary nodes. If w is close to 0, then nodes that supply up-to-date location information will be favored, which may be desirable for networks of highly mobile nodes. It may also be possible for the parameter w to be "learned" by the algorithm using swarm intelligence or related techniques.

Two-Way Learning

In addition to learning which nodes are good location servers, a node can learn whether it is a good server itself by keeping its own location server "goodness" pheromone. The magnitude of this pheromone dictates how many locations the node stores, and/or how often it will answer received requests. Each time the node answers a request successfully, it increments this pheromone (step 2115). The pheromone decays over time using the pheromone decay mechanism.

Since it is possible that a node with a large amount of memory might never be asked for location information, this two-way learning mechanism can be used to reduce the likelihood the node will expend energy storing unnecessary information.

Fixed Location Servers

If it is possible to set up fixed location servers in the network, the algorithm can accommodate these servers by storing their information in the scorecard and not removing them, or by using a different pheromone decay mechanism for the fixed servers. In this way the algorithm is very flexible.

SARA Advantages

The major advantages of SARA over traditional routing table-based approaches boil down to decreased overhead due to not maintaining routes, faster and more reliable packet delivery (proven by our simulations and reflected by the metrics), and learning/adaptability (because of the use of swarm, random discovery, etc.).

Very simple, elegant code, requiring limited processing power and memory

Biologically-inspired algorithms provide redundancy, intelligence and adaptability Traditional routing tables are not used or necessary Distributed, reactive approach, with no central point of control Algorithms execute in a purely distributed manner, using only local data Flexible and highly scalable: can scale to 100s of thousands of nodes Initialization is extremely high speed with high volume packet delivery Able to learn, adapt and truly self-organize and heal within seconds Totally different thinking paradigm from the wired routing protocols and existing wireless routing algorithms Specifically designed for "last mile" ad-hoc networks, both mobile and stationary Designed to operate seamlessly with connectionless radio hardware and to use minimal battery power Many times more efficient than IP-based routing Extremely efficient: nodes can very quickly join and leave the network Able to incorporate mobile and high-speed moving objects into the network Capacity dominant bandwidth for the entire network and increase network efficiency Totally decentralized in structure and behavior (no access points or central points of operation)

Automatic route (re)discovery for the mobile nodes and changing environment

Collision-avoidance and conflict-resolution are done automatically

High-speed and high volume packet delivery

No set-up or configuration required

Able to connect back to the Internet through a gateway

Extremely low network startup and node association times

Location-awareness allows geographical routing and "geocasting"

COTS based hardware platforms, compatible with a variety of sensor interfaces

Simulation and Algorithm Performance

The inventive swarm algorithms are being tested in two simulation environments: a custom SwarmSim simulator, and the commercial QualNet simulator from Scalable Network Technologies. Additionally, Bluetronix Inc. is developing a hardware test-bed to demonstrate the algorithms' performance in a "real world" test. The metrics listed below will be gathered for ad hoc networks with varying numbers of nodes, varying types of mobility, and varying amounts of network traffic. Both the simulation environment and the hardware test-bed are being designed in such a way that gathering additional measurements will be easy.

Simulation Metrics

Packet delivery ratio

Energy consumption

End-to-end delay efficiency and overhead

Jitter (delay between packets)

Hardware Metrics

Packet delivery ratio

Energy consumption

End-to-end delay

Efficiency and overhead

Jitter (delay between packets)

Peak memory usage

SwarmSim.

SwarmSim, developed by Bluetronix Inc. under funding from DARPA, allows comparison of the swarm algorithm SARA against the known Dynamic Source Routing (DSR)

algorithm. SwarmSim assumes realistic physics for broadcasting, including the effects of finite propagation speed, signal interference, and attenuation. The simulator includes tools for generating node distributions with different statistical properties. Each node may have a different broadcast power and range as well as different antenna gain. The simulator has a graphical user interface that displays node position, packet propagation, collisions, and completed paths. The user interface allows for slowing down the simulation display, panning and zooming. Tests using SwarmSim have shown very favorable results.

Currently, SARA is being compared with AODV, DSR, and LAR1 using QualNet. These three protocols are well-known and heavily studied. Various comparison metrics have been studied to date:

Mobility.

Figure 23:
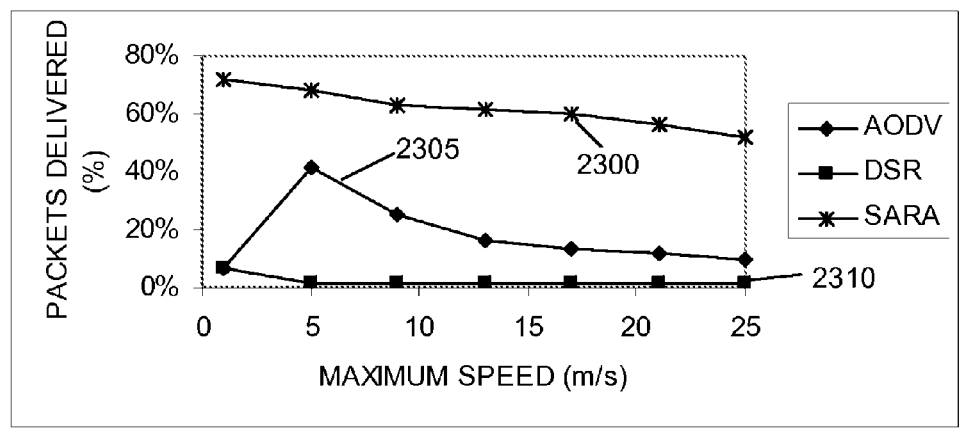

The main problem mobility causes for routing protocols is link breakages. If a node moves out of range of another node, then routes relying on the adjacency of those two nodes become invalid. AODV and DSR, with their reliance on discovering and storing routes, generally do not perform well in networks of highly mobile nodes. SARA addresses the mobility issue by making routing decisions at each step along the path from sender to receiver, so there is little possibility of link breakage. FIG. 23 shows the percentage of packets delivered by AODV, DSR, and SARA in a network of 50 mobile nodes as the maximum node speed increases.

Network Traffic.

Figure 24:
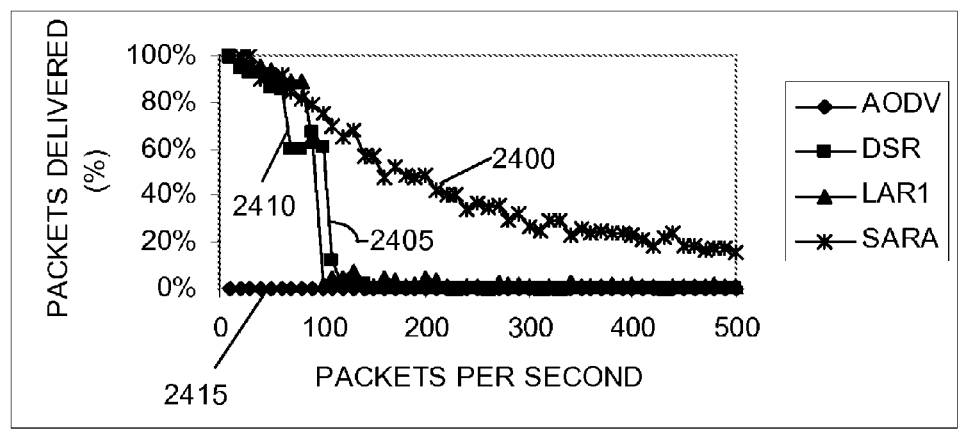

As the amount of data being sent on a network increases, the inefficiencies of a routing protocol become more apparent. AODV, DSR, and LAR have high overhead that dramatically affects their performance past a certain point. FIG. 24 shows that SARA outperforms the other protocols as the number of packets sent per second increases.

Scalability.

Figure 25:
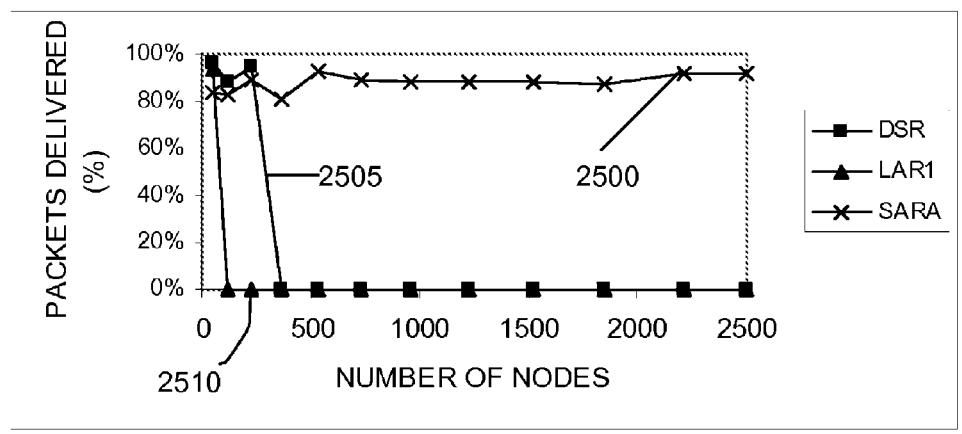

Scalability to large numbers of nodes is an important feature for MANET routing algorithms. Because of their reliance on global routing tables, AODV and DSR do not perform well in very large networks. Clearly the more information a node knows about the network, the more intelligent routing decisions it can make. However, nodes running SARA are not required to have any global knowledge; they need to know only about their neighbors in order to make a decision. This means that SARA can scale to large numbers of nodes, and that in small networks the memory requirements of SARA are small. FIG. 25 shows SARA scaling well even in networks of thousands of nodes, while DSR and LAR do not scale past a few hundred devices.

Energy Consumption.

Figure 26:
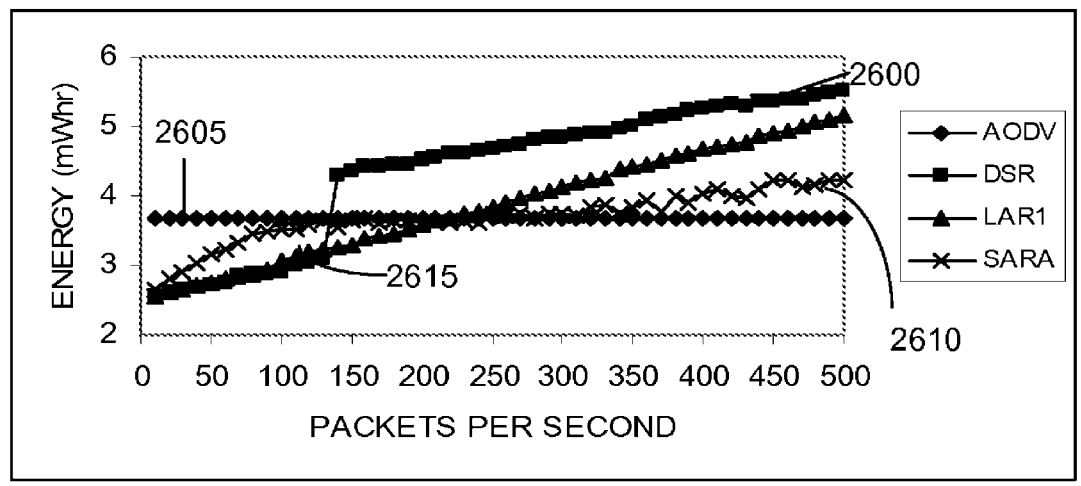
Figure 27:
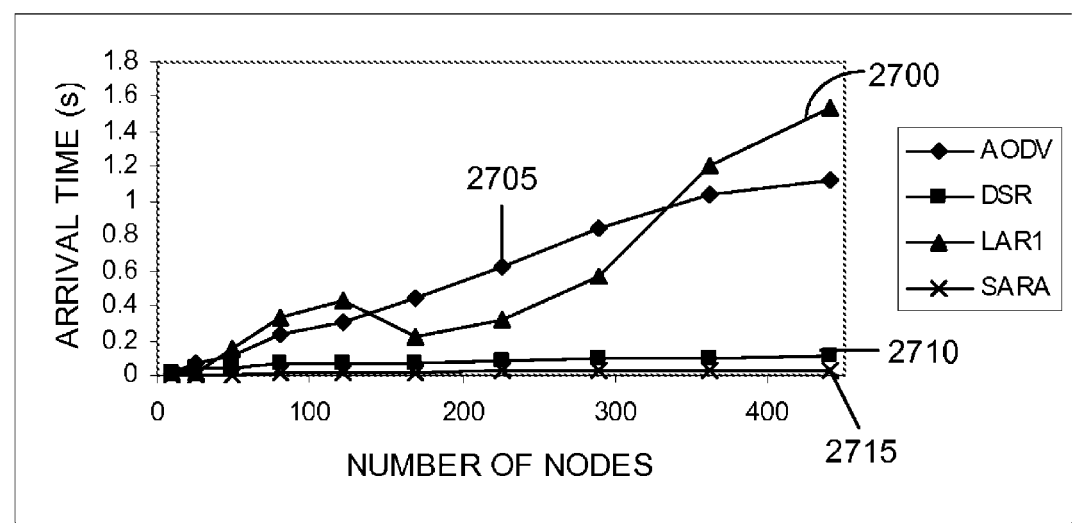

Because nodes in a wireless network are typically battery-powered devices, energy consumption is a critical metric for a routing protocol. FIG. 26 shows the average energy consumed per node as network traffic increases (see also FIG. 24, which shows packet delivery).

Speed.

The speed at which a protocol can deliver packets is critical to achieving the high throughput necessary for delivering voice, images, and video in a timely manner. SARA delivers packets very quickly because it requires very little protocol overhead, while AODV, DSR, and LAR exchange many non-data bits resulting in slow performance. See FIG. 27, which shows average packet arrival time versus the number of nodes in a network.

Simulation results are very promising, and show that SARA is a highly capable routing solution for MANETs where there are many nodes, nodes are highly mobile, and energy consumption is a critical concern.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for relaying communications among a plurality of communication nodes in a mobile ad hoc network (MANET), wherein each node is a device that has computing and wireless communication broadcasting and receiving capabilities plus a broadcastable identifier, wherein wireless communication comprises broadcasting a packet containing a message portion, and wherein the method is implemented in each node such that each node considers itself to be a current node in the context of the method steps it carries out; the method in the current node comprising the steps of:

identifying a set of neighbor nodes for the current node by determining whether a node qualifies by being within wireless communication range;

without knowledge of a route to a packet's ultimate destination, broadcasting any packet originated at the current node, or re-broadcasting any received packet to relay it, by randomly selecting no more than one of the neighbor nodes to have its identifier set in the packet as a designated receiver node that should re-broadcast the packet; and examining received packets to learn the designated receiver node identifier if one is contained therein, then using the following steps to guide re-broadcasting actions:

if the current node is the designated receiver node, then re-broadcasting the packet;

and if the current node is not the designated receiver node, then only re-broadcasting the packet according to a predetermined non-designated receiver re-broadcast probability.

2. The method of claim 1, further comprising the step of:

additionally limiting identification of neighbor nodes to determining whether nodes also have the current node within their radio range, thereby assuring that a neighbor node has a bi-directional communication link with the current node.

3. A routing table independent mobile ad hoc network (MANET) communication method for relaying communications among a plurality of communication nodes, wherein each node is a device that has computing and wireless communication broadcasting and receiving capabilities plus a broadcastable identifier, wherein wireless communication comprises broadcasting a packet containing a message portion, a message source node S identifier, and a message destination node D identifier; and wherein the method is implemented in each node such that each node considers itself to be a current node in the context of the method steps it carries out; the method in the current node comprising the steps of:

for every broadcast packet received by the current node, processing the received packet for passively learning about other nodes; thereby minimizing broadcasting by avoiding pro-active learning through exchange of node information protocol packets;

wherein packets can contain a sending node identifier and a designated receiver node identifier: including the current node's identifier as the sending node in every packet that is broadcast;

establishing a receiving (RX) pheromone and a transmission (TX) pheromone for each other node from which the current node receives a packet, and associating the other node's identifier with its respective RX and TX pheromones, wherein receiving from an other node means that the receiving node directly received, in a single hop, a packet transmitted by the other node;

defining a neighbor node as being an other node that is associated with RX and TX pheromones that both have values above predetermined minimum values;

maintaining a table of neighbor node identifiers with respective RX and TX pheromone values, and continuously updating the table by:

defining the RX pheromone as an indicator of whether the associated node can receive packets from the current node;

defining the TX pheromone as an indicator of whether the associated node can transmit packets to the current node;

increasing the value of an other node's TX pheromone whenever a packet is received from the respective other node;

decreasing the value of each established TX pheromone whenever a predetermined amount of time elapses from the most recent value modification of the subject TX pheromone;

increasing the value of an other node's RX pheromone whenever a packet is received from the respective other node and the received packet is a re-broadcast of a packet just previously broadcast by the current node;

decreasing the value of each established RX pheromone whenever a predetermined amount of time elapses from the most recent value modification of the subject RX pheromone; and broadcasting any packet originated at the current node or re-broadcasting any received packet to relay it, by selecting no more than one node to be identified in the packet as the designated receiver node, selected from among the nodes currently defined as neighbor nodes;

and examining received packets to learn the designated receiver node identifier if one is contained therein, then using the following steps to guide re-broadcasting actions:

if the current node is the designated receiver node, then re-broadcasting the packet; and if the current node is not the designated receiver node, then only re-broadcasting the packet according to a predetermined non-designated receiver re-broadcast probability.

4. The MANET communication method of claim 3, further comprising the step of:

no longer saving an other node's identifier and associated pheromone values when the other node's RX and TX pheromone values both fall below predetermined minimum values.

5. The MANET communication method of claim 3, further comprising the steps of:

maintaining a partial path list in the packets, the path list being at least the most recent portion of a sequential listing of identifiers for the nodes through which the packet has passed in sequence; and when learning from a packet, increasing the TX pheromone for any node that sequentially immediately precedes the current node anywhere in the path list; and increasing the RX pheromone for any node that sequentially immediately follows the current node anywhere in the path list.

6. The MANET communication method of claim 3, further comprising the step of:

exclusively upon receiving a communication packet that identifies the current node as the message destination node D, changing the packet contents to indicate the current node as a new message source node S', and the original message source node S as a new message destination node D'; and broadcasting the so-changed message packet according to the method as claimed, thereby discovering a new path back to the message source node S, for acknowledging receipt of the message packet by the original message destination node D.

7. The MANET communication method of claim 3, wherein after broadcasting a particular communications packet, the method further comprises the steps of:

during a predetermined amount of retry time, checking received packets for matches to the particular communications packet;

if no match is received by the end of the retry time, then retrying broadcasting of the particular communications packet without changing the designated receiver node; and no longer checking received packets for matches to the particular communications packet once a match has been detected, or once a maximum number of retries has been achieved.

8. The MANET communication method of claim 3, further comprising the step of:

selecting a one of the neighbor nodes that has the best quality communication link with the current node as determined by the highest neighbor pheromone values.

9. The MANET communication method of claim 3, further comprising the step of:

randomly selecting the one of the neighbor nodes.

10. The MANET communication method of claim 3, further comprising the step of:

selecting a null value for the designated receiver node identifier when a node cannot be found that meets predetermined selection criteria.

11. The MANET communication method of claim 3, wherein a geographic location and broadcast range of other nodes can be known by the current node, the method further comprising the steps of:

adding a goodness time delay to a random time delay for re-broadcasting; and calculating the goodness time delay by conditionally selecting one of the method steps of:

if the message destination node D is within the broadcast range of the node that previously broadcasted the packet, then maximizing the goodness time delay;

if the message destination node D is within the broadcast range of the current node, then minimizing the goodness time delay; or otherwise making the goodness time delay proportional to the ratio of the current node's broadcast range to the distance from the current node to the message destination node D.

12. The MANET communication method of claim 3, wherein the geographic location and broadcast range of other nodes can be known by the current node, and the current node knows the location of the message destination node D plus the location and broadcast range of at least one neighbor node, the method further comprising the steps of:

when broadcasting a packet identifying a message destination node D that is not a neighbor node, conditionally selecting a best neighbor to set as the designated receiver node according to the criteria of:
- if the message destination node D is within the broadcast range of a subset of the neighbor nodes, then the best neighbor node is the one of the subset of neighbor nodes that is closest to a line between the current node and the message destination node D; or else
- the best neighbor node is the one of the neighbor nodes that has the least distance from the neighbor node's broadcast range to the message destination node D.

13. The MANET communication method of claim 3, wherein the geographic location of other nodes can be known by the current node and the current node knows the location of the message destination node D, the method further comprising the steps of:
- establishing a grid of zones around the current node wherein each zone has specified geographic boundaries and a unique zone ID;
- upon receiving a packet from a one neighbor node wherein the packet has a message source node S located within a particular zone, increasing the value of a destination zone pheromone that is associated with the one neighbor node and the particular zone; and
- when broadcasting a packet for a message destination node D that is known to be located within a specific zone, selecting a best neighbor to set as the designated receiver node according to which of the neighbor nodes has the highest valued destination zone pheromone that is associated with the specific zone.

14. The MANET communication method of claim 13, further comprising the step of:
- increasing the value of a destination zone pheromone such that the amount of an increase is inversely related to an average number of node to node hops taken in the path from the message source node S to the neighbor node or if adequate location information is known, inversely related to the geographical distance from the message source node S to the neighbor node.

15. The MANET communication method of claim 3, further comprising the steps of:
- upon receiving a packet from a one neighbor node N wherein the packet has a particular message source node D, increasing the value of a destination pheromone $P_{N,D}$ that is associated with the one neighbor N and the particular message source node D; and
- when broadcasting a packet for a message destination node D that is the same node as the particular message source node D, selecting a best neighbor to make the designated receiver node according to which of the neighbor nodes N has the highest valued destination pheromone $P_{N,D}$ that is associated with the message destination node D.

* * * * *